US010537073B2

(12) United States Patent
Turk et al.

(10) Patent No.: US 10,537,073 B2
(45) Date of Patent: Jan. 21, 2020

(54) CONDUIT WITH CONNECTOR AND ASSEMBLY THEREOF

(71) Applicant: Rain Bird Corporation, Azusa, CA (US)

(72) Inventors: Michael F. Turk, Porter Ranch, CA (US); Samir Shah, Chino Hills, CA (US); Gerhard Stoltz, Temecula, CA (US); James Richard Parks, Santa Clarita, CA (US); Mark Murphy Ensworth, Orange, CA (US)

(73) Assignee: Rain Bird Corporation, Azusa, CA (US)

( * ) Notice: Subject to any disclaimer, the term of this patent is extended or adjusted under 35 U.S.C. 154(b) by 58 days.

(21) Appl. No.: 15/598,967

(22) Filed: May 18, 2017

(65) Prior Publication Data

US 2017/0251612 A1    Sep. 7, 2017

Related U.S. Application Data

(63) Continuation-in-part of application No. 14/087,900, filed on Nov. 22, 2013, now Pat. No. 9,668,431, and
(Continued)

(51) Int. Cl.
*A01G 25/02*    (2006.01)
*B05B 15/658*    (2018.01)
(Continued)

(52) U.S. Cl.
CPC .......... *A01G 25/023* (2013.01); *A01G 25/026* (2013.01); *B05B 15/65* (2018.02);
(Continued)

(58) Field of Classification Search
CPC ...... B05B 15/65; B05B 15/658; F16L 33/223; F16L 33/227; F16L 41/08; F16L 57/005;
(Continued)

(56) References Cited

U.S. PATENT DOCUMENTS 1,484,575 A    2/1924  Shulin
1,960,472 A    5/1934  Balaam
(Continued)

FOREIGN PATENT DOCUMENTS

AU    2007231848    5/2008
EP    0594361    4/1994
(Continued)

OTHER PUBLICATIONS

Antelco Irrigation Equipment, Take-Off Fittings, Metric Catalogue, 2014, pp. 5.4 and 5.5.
(Continued)

*Primary Examiner* — Steven J Ganey
(74) *Attorney, Agent, or Firm* — Fitch, Even, Tabin & Flannery, LLP

(57) ABSTRACT

A fluid supply line is provided to reduce the labor and cost required for dripline system installations by providing predetermined fitting locations where driplines can be attached. The supply line consists of a conduit having a side wall, a connector extending through the side wall of the conduit, the connector having a conduit connecting segment extending outside the conduit and an inlet segment extending into the conduit, and the inlet segment being connected to the side wall of the conduit.

29 Claims, 40 Drawing Sheets

Related U.S. Application Data a continuation-in-part of application No. 13/837,738, filed on Mar. 15, 2013, now Pat. No. 9,661,807.

(60) Provisional application No. 61/754,396, filed on Jan. 18, 2013, provisional application No. 61/651,433, filed on May 24, 2012.

(51) Int. Cl.

| | | |
|---|---|---|
| *F16L 33/22* | (2006.01) | |
| *B05B 15/65* | (2018.01) | |
| *F16L 41/08* | (2006.01) | |
| *F16L 57/00* | (2006.01) | |
| *F16L 41/02* | (2006.01) | |

(52) U.S. Cl.
CPC .......... *B05B 15/658* (2018.02); *F16L 33/223* (2013.01); *F16L 33/227* (2013.01); *F16L 41/08* (2013.01); *F16L 57/005* (2013.01); *F16L 41/021* (2013.01); *F16L 2201/80* (2013.01)

(58) Field of Classification Search
CPC ..... F16L 41/021; F16L 2201/80; F16L 37/54; F16L 33/225; A01G 25/023; A01G 25/026
USPC ............. 239/542, 547, 600; 285/5, 242, 255
See application file for complete search history.

(56) References Cited

U.S. PATENT DOCUMENTS

| | | | |
|---|---|---|---|
| 2,148,419 A | 2/1939 | Parker | |
| 2,281,172 A | 4/1942 | Rodgers | |
| 2,287,354 A | 6/1942 | Misch | |
| 2,344,163 A | 3/1944 | Misch | |
| 2,598,961 A | 6/1952 | Andrus | |
| 2,605,140 A | 7/1952 | Bartling | |
| 2,757,966 A | 8/1956 | Samiran | |
| 2,839,075 A | 6/1958 | Mueller | |
| 3,030,031 A | 4/1962 | Barker | |
| 3,199,791 A | 8/1965 | Chapin | |
| 3,256,693 A | 6/1966 | Mathis | |
| 3,335,964 A | 8/1967 | Singleton | |
| 3,349,792 A | 10/1967 | Larkin | |
| 3,361,359 A | 1/1968 | Chapin | |
| 3,361,363 A | 1/1968 | Babington | |
| 3,429,125 A | 2/1969 | Shotton | |
| 3,432,188 A | 3/1969 | Turner | |
| 3,471,176 A | 10/1969 | Gilchrist | |
| 3,489,441 A | 1/1970 | Malcolm | |
| 3,503,407 A | 3/1970 | Ver Nooy | |
| 3,516,426 A | 6/1970 | Toll | |
| 3,640,465 A | 2/1972 | Hicks | |
| 3,672,571 A | 6/1972 | Goodricke | |
| 3,756,267 A | 9/1973 | Hutton | |
| 3,762,263 A | 10/1973 | Bocceda | |
| 3,806,031 A | 4/1974 | Olson | |
| 3,849,639 A | 11/1974 | Brock | |
| 3,863,960 A | 2/1975 | Andersson | |
| 3,870,431 A | 3/1975 | Ellis | |
| 3,872,880 A | 3/1975 | Osburn | |
| 3,876,146 A | 4/1975 | Pacheco | |
| 3,891,247 A | 6/1975 | Smith | |
| 3,897,009 A | 7/1975 | Rangel-Garza | |
| 3,920,037 A | 11/1975 | Garrett | |
| 3,973,732 A | 8/1976 | Diggs | |
| 3,976,091 A | 8/1976 | Hutton | |
| 3,999,785 A | 12/1976 | Blakeley | |
| 4,018,459 A | 4/1977 | Mominee | |
| 4,018,464 A | 4/1977 | Acda | |
| 4,056,229 A | 11/1977 | Jones | |
| 4,063,844 A | 12/1977 | Pessia | |
| 4,065,926 A | 1/1978 | Brandt | |
| 4,076,038 A | 2/1978 | Wynne | |
| 4,100,940 A | 7/1978 | Spears | |
| 4,134,550 A * | 1/1979 | Bright, Sr. ........... A01G 25/023 239/542 |
| 4,239,265 A | 12/1980 | King | |
| 4,278,279 A | 7/1981 | Zimmerman | |
| 4,317,539 A | 3/1982 | Pollock | |
| 4,391,458 A | 7/1983 | Blakeley | |
| 4,522,339 A | 6/1985 | Costa | |
| 4,562,963 A | 1/1986 | Butler | |
| 4,589,688 A | 5/1986 | Johnson | |
| 4,606,558 A | 8/1986 | Davidson | |
| 4,611,624 A | 9/1986 | Snyder | |
| 4,626,142 A | 12/1986 | Brin | |
| 4,655,480 A | 4/1987 | Thalmann | |
| 4,674,681 A | 6/1987 | Meis | |
| 4,708,373 A | 11/1987 | Morriss | |
| 4,719,936 A | 1/1988 | Tsubakimoto | |
| 4,730,636 A | 3/1988 | Volgstadt | |
| 4,753,394 A | 6/1988 | Goodman | |
| 4,789,189 A | 12/1988 | Robertson | |
| 4,809,735 A | 3/1989 | Volgstadt | |
| 4,930,934 A | 6/1990 | Adkins | |
| 4,956,916 A | 9/1990 | Robertson | |
| 4,966,397 A | 10/1990 | McKinnon | |
| 5,020,832 A | 6/1991 | Coblentz | |
| D318,403 S | 7/1991 | Leap | |
| 5,040,828 A | 8/1991 | Kane | |
| 5,066,053 A | 11/1991 | Miller | |
| 5,076,318 A | 12/1991 | Fedora | |
| 5,095,564 A | 3/1992 | Kruger | |
| 5,105,844 A | 4/1992 | King | |
| 5,111,995 A | 5/1992 | Dumitrascu | |
| 5,131,597 A | 7/1992 | Bard | |
| 5,169,177 A | 12/1992 | McLennan | |
| 5,241,981 A | 9/1993 | Ahern | |
| 5,285,968 A | 2/1994 | McSheehy | |
| 5,286,070 A | 2/1994 | Williams | |
| 5,360,241 A | 11/1994 | Gundy | |
| 5,368,235 A | 11/1994 | Drozdoff | |
| 5,375,887 A | 12/1994 | Johnson | |
| 5,425,395 A | 6/1995 | Brennan | |
| 5,507,536 A | 4/1996 | Oliveto, II | |
| 5,553,898 A | 9/1996 | Rogers | |
| 5,659,935 A | 8/1997 | Lo-Pinto | |
| 5,692,858 A | 12/1997 | Vaughan | |
| 5,694,971 A | 12/1997 | Wilcock | |
| 5,694,972 A * | 12/1997 | King ................... A01G 25/023 285/197 |
| 5,732,732 A | 3/1998 | Gross | |
| 5,829,474 A | 11/1998 | Bolender | |
| 5,839,659 A | 11/1998 | Murray | |
| 5,893,686 A | 4/1999 | Weiler | |
| 5,927,615 A | 7/1999 | Turk | |
| 5,938,372 A | 8/1999 | Lichfield | |
| 5,964,240 A | 10/1999 | Granovski | |
| 6,012,475 A | 1/2000 | Taylor | |
| 6,065,693 A | 5/2000 | Lukas | |
| 6,216,723 B1 | 4/2001 | King | |
| 6,293,477 B1 | 9/2001 | Chambers | |
| 6,357,472 B1 | 3/2002 | King | |
| 6,394,368 B1 | 5/2002 | Hintz | |
| 6,412,824 B2 | 7/2002 | Kunsman | |
| 6,454,312 B1 | 9/2002 | Désorcy | |
| 6,510,865 B2 | 1/2003 | King | |
| 6,547,159 B1 | 4/2003 | Westby | |
| 6,601,605 B2 | 8/2003 | King | |
| 6,612,330 B1 | 9/2003 | Robison | |
| 6,640,827 B1 | 11/2003 | McClure | |
| 6,648,377 B2 | 11/2003 | Marandi | |
| 6,648,562 B1 | 11/2003 | Calkins | |
| 6,681,796 B2 | 1/2004 | King | |
| 6,758,237 B2 | 7/2004 | Sichler | |
| 6,767,033 B2 | 7/2004 | King | |
| 6,773,036 B1 | 8/2004 | King | |
| 6,854,616 B2 | 2/2005 | Steffan | |
| 6,907,896 B1 | 6/2005 | Christodoulou | |
| 6,959,882 B1 | 11/2005 | Potts | |
| 6,986,532 B1 | 1/2006 | King | |

(56) References Cited

U.S. PATENT DOCUMENTS

| | | |
|---|---|---|
| 6,996,932 B2 | 2/2006 | Kruer |
| 6,997,402 B2 | 2/2006 | Kruer |
| 7,021,328 B2 | 4/2006 | Robison |
| 7,048,010 B2 | 5/2006 | Golan |
| 7,150,289 B2 | 12/2006 | Mortensen |
| 7,219,684 B2 | 5/2007 | Dabir |
| 7,392,614 B2 | 7/2008 | Kruer |
| 7,523,965 B2 | 4/2009 | Masarwa |
| 7,588,201 B2 | 9/2009 | Masarwa |
| 7,647,724 B2 | 1/2010 | Caron |
| 7,670,521 B2 | 3/2010 | Campau |
| 7,673,418 B2 | 3/2010 | Wong |
| 7,862,254 B2 | 1/2011 | Jin Hyun |
| 7,913,935 B2 | 3/2011 | Einav |
| 7,954,732 B2 | 6/2011 | Shekalim |
| 8,091,800 B2 | 1/2012 | Retter |
| 8,132,739 B2 | 3/2012 | Théorêt |
| 8,220,838 B2 | 7/2012 | Masarwa |
| 8,333,410 B2 | 12/2012 | Boticki |
| D696,087 S | 12/2013 | White |
| 8,672,240 B2 | 3/2014 | Masarwa |
| 8,770,888 B2 | 7/2014 | Helbig |
| 8,898,876 B2 | 12/2014 | Feith |
| 9,167,757 B2 | 10/2015 | Hamann |
| 9,173,353 B2 | 11/2015 | Hamann |
| 9,173,354 B2 | 11/2015 | Hamann |
| 9,179,610 B2 | 11/2015 | Hamann |
| 9,241,449 B2 | 1/2016 | Hamann |
| 9,414,551 B2 | 8/2016 | Masarwa |
| 9,561,480 B2 | 2/2017 | Jaeger |
| 9,661,807 B2 | 5/2017 | Turk |
| 9,668,431 B2 | 6/2017 | Turk |
| 9,772,057 B2 | 9/2017 | Keren |
| 9,821,335 B2 | 11/2017 | Burrous |
| 10,105,659 B2 | 10/2018 | Jaeger |
| 10,267,437 B2 | 4/2019 | Yeiser |
| 2002/0098322 A1 | 7/2002 | Cripp |
| 2004/0046045 A1 | 3/2004 | Alexander |
| 2004/0113425 A1* | 6/2004 | King ................ F16L 47/345 285/197 |
| 2004/0195391 A1 | 10/2004 | Kruer |
| 2004/0222321 A1 | 11/2004 | Golan |
| 2005/0023382 A1 | 2/2005 | Fiedler |
| 2005/0034762 A1 | 2/2005 | Maier |
| 2005/0080481 A1 | 4/2005 | Madda |
| 2005/0145716 A1 | 7/2005 | Manning |
| 2005/0194469 A1 | 9/2005 | Masarwa |
| 2005/0279856 A1 | 12/2005 | Nalbandian |
| 2006/0027266 A1 | 2/2006 | Kim |
| 2006/0065306 A1 | 3/2006 | Mortensen |
| 2006/0185241 A1 | 8/2006 | Theoret |
| 2006/0272726 A1 | 12/2006 | Golan |
| 2007/0144065 A1 | 6/2007 | Lowe |
| 2007/0189852 A1 | 8/2007 | Wolfley |
| 2007/0194149 A1 | 8/2007 | Mavrakis |
| 2007/0228725 A1 | 10/2007 | Campau |
| 2008/0155892 A1 | 7/2008 | Katzir-Shimoni |
| 2008/0169641 A1 | 7/2008 | Santa Cruz |
| 2008/0271366 A1 | 11/2008 | Thompson |
| 2008/0282609 A1 | 11/2008 | Nelson |
| 2009/0224078 A1 | 9/2009 | Anderson |
| 2009/0243146 A1 | 10/2009 | Retter |
| 2012/0080879 A1 | 4/2012 | Gauthier |
| 2012/0097196 A1 | 4/2012 | Cohen |
| 2012/0111972 A1 | 5/2012 | Théorêt |
| 2012/0248759 A1 | 10/2012 | Feith |
| 2013/0007440 A1 | 1/2013 | Shah |
| 2013/0074400 A1 | 3/2013 | Roess |
| 2013/0183097 A1 | 7/2013 | Scantling |
| 2014/0001743 A1 | 1/2014 | Keren |
| 2014/0014735 A1 | 1/2014 | Ford |
| 2014/0021273 A1 | 1/2014 | Turk |
| 2014/0252103 A1 | 9/2014 | Hamann |
| 2014/0252112 A1 | 9/2014 | Hamann |
| 2014/0252113 A1 | 9/2014 | Hamann |
| 2014/0252114 A1 | 9/2014 | Hamann |
| 2014/0252133 A1 | 9/2014 | Hamann |
| 2015/0144717 A1 | 5/2015 | Turk |
| 2016/0113218 A1 | 4/2016 | Turk |
| 2016/0255809 A1 | 9/2016 | Dowd |

FOREIGN PATENT DOCUMENTS

| | | |
|---|---|---|
| FR | 2704117 | 10/1994 |
| FR | 2704117 A1 | 10/1994 |
| GB | 2037921 | 7/1980 |
| GB | 2037921 A | 7/1980 |
| RU | 90653 | 1/2010 |
| RU | 2417579 C2 | 5/2011 |
| WO | 2007029234 | 3/2007 |
| WO | 2013107954 | 7/2013 |
| WO | 2013177530 | 11/2013 |
| WO | 2016065287 | 4/2016 |

OTHER PUBLICATIONS

Antelco Irrigation Equipment, Xpando Take-Off Fittings, USA Catalog, 2012, p. 5.1.

Hunter Industries Brochure, "ECO-MAT and PLD-ESD: Subsurface Irrigation," bearing a copyright date of 2012, 8 pages.

Hunter Industries, "Drip Irrigation Design & Installation Guide," bearing a copyright date of 2012, 32 pages.

Irrigation Assembly including elbow connectors made by the Rain Bird Corporation, assignee of the subject application. The irrigation assembly was installed outdoors and publicly accessible prior to Nov. 22, 2013, 3 pages.

Kisss, "Nano-Technical Specification: Subsurface Textile Irrigation (SSTI)," bearing an updated date of Jan. 2015, 2 pages.

Kisss, "Subsurface Textile Irrigation (SSTI)—Fact Sheet," bearing an updated date of Jan. 2015, 6 pages.

Netafim Brochure, "Flatnet Flexible Pipes," publicly available before May 24, 2012, 8 pages.

Netafim Brochure, "Flexible Pipes Flatnet," publicly available before May 24, 2012, pp. 16-20.

Netafim Brochure, "Polynet Flexible Pipes," publicly available before May 24, 2012, 8 pages.

PCT International Preliminary Report on Patentability of the International Bureau of WIPO for International Application No. PCT/US2015/057160 dated Apr. 27, 2017 (5 pages).

PCT International Search Report and Written Opinion of the European Patent Office International Searching Authority for International Application PCT/US2015/057160, dated Mar. 10, 2016, 7 pages.

PCT International Search Report and Written Opinion of the International Searching Authority dated Aug. 29, 2013 for International Application No. PCT/US2013/042683, 9 pages.

Pictures showing technique for connecting a feed tube for a sprinkler to poly tubing which includes forming a hole in the poly tubing, the technique and components used all being publicly available more than one year before May 24, 2012 (3 pages).

Rain Bird Corporation, Comparison of QF Dripline Header to prior art PVC Header, publicly available Jan. 2015, 1 page.

Toro, Loc-Eze Fittings and Accessories, http://www.toro.com/en-gb/homeowner/professional-irrigation/landscape-drip/Pages/Model.aspx?pid=loc-eze-fittings-and-accessories, publicly available before May 24, 2012, one page.

U.S. Appl. No. 14/087,900 entitled "Conduit With Connector and Assembly Thereof," filed Nov. 22, 2013, 72 pages.

U.S. Appl. No. 62/067,938, filed Oct. 23, 2014, entitled "Drip Emitter Tubing Expandable Into Grid," 35 pages.

U.S. Appl. No. 13/837,738; Office Action dated Apr. 1, 2015; 5 pages.

U.S. Appl. No. 13/837,738; Office Action dated Aug. 28, 2015; 6 pages.

U.S. Appl. No. 14/921,484; Office Action dated Jan. 26, 2017; 9 pages.

U.S. Appl. No. 13/837,738; Notice of Allowance dated Jan. 25, 2017; (5 pages).

(56) References Cited

OTHER PUBLICATIONS

U.S. Appl. No. 13/837,738; Office Action dated Jun. 8, 2016; (5 pages).
U.S. Appl. No. 13/837,738; Office Action dated Sep. 16, 2016; (6 pages).
U.S. Appl. No. 14/087,900; Notice of Allowance dated Jan. 26, 2017; (7 pages).
U.S. Appl. No. 14/087,900; Office Action dated Apr. 5, 2016; (7 pages).
U.S. Appl. No. 14/087,900; Office Action dated Oct. 5, 2016; (7 pages).
U.S. Appl. No. 14/921,484; Office Action dated Sep. 6, 2016; 12 pages.
USPTO; Office Action dated Feb. 2, 2018 for U.S. Appl. No. 14/921,484, 10 pages.
European Patent Office, Partial Supplementary European Search Report for European Patent Application 15851751.6 dated Jun. 1, 2018, 14 pages.
European Patent Office, Extended European Search Report for European Patent Application No. 15851751.6 dated Sep. 10, 2018, 12 pages.
USPTO; U.S. Appl. No. 14/921,484; Office Action dated Aug. 2, 2018; (pp. 1-11).

* cited by examiner

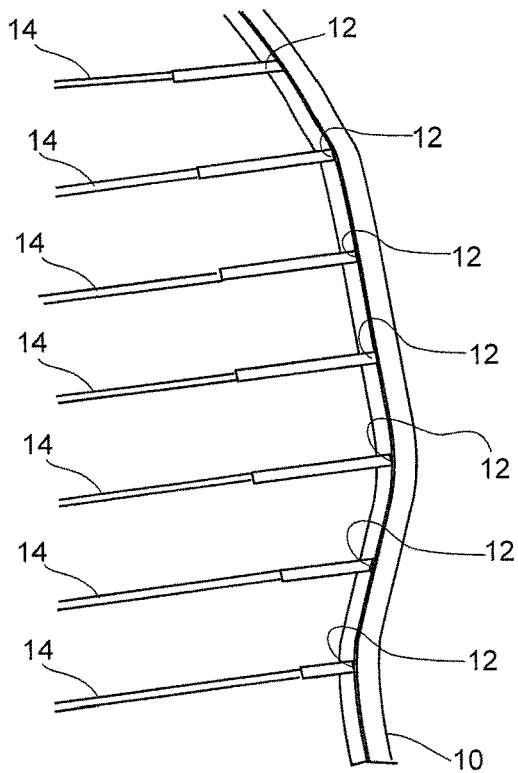
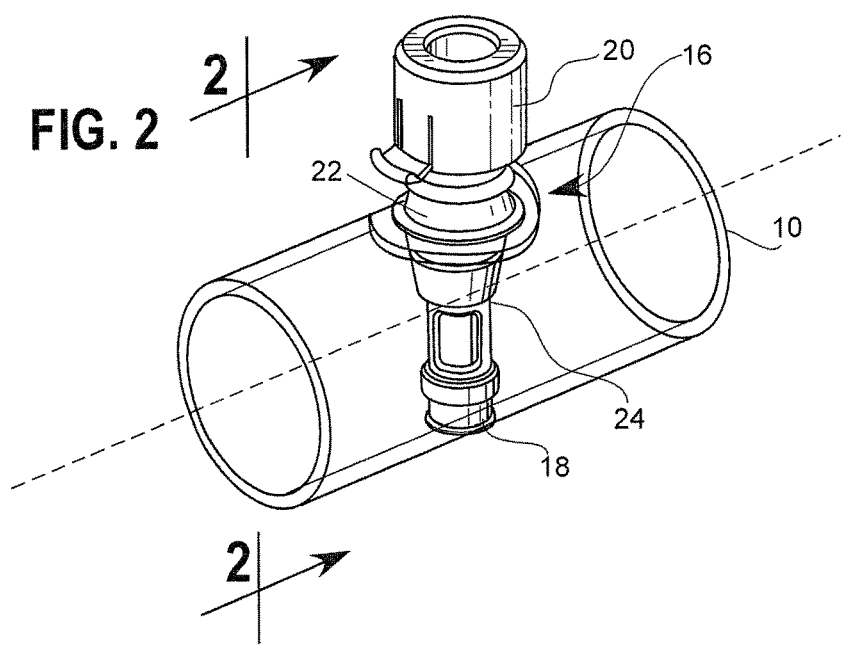

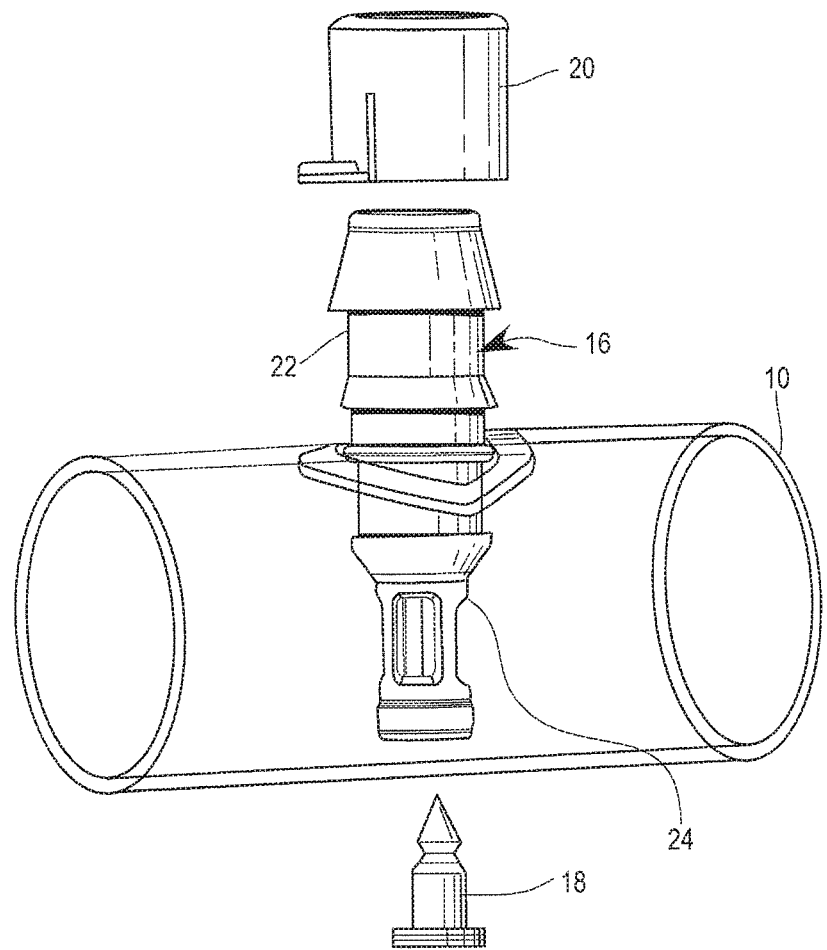

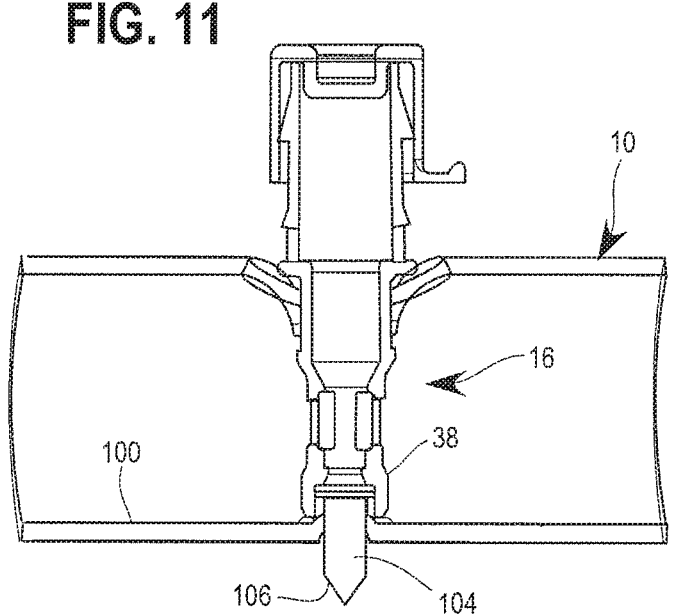
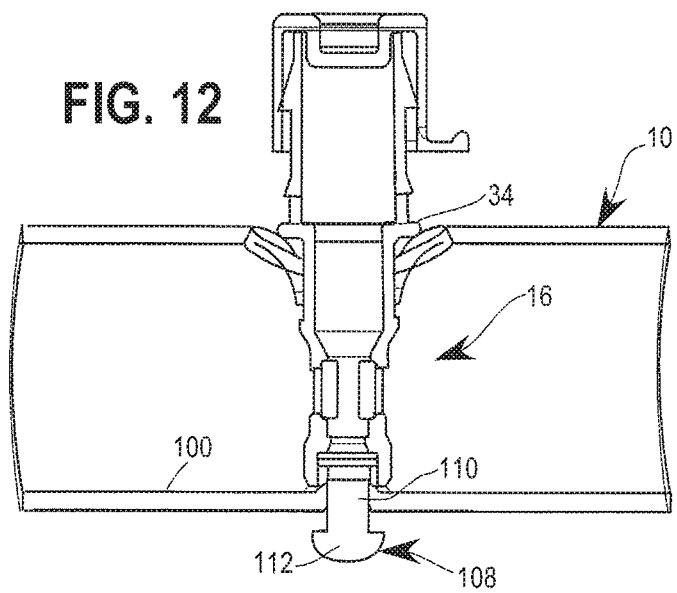

CONDUIT WITH CONNECTOR AND ASSEMBLY THEREOF

CROSS-REFERENCE TO RELATED APPLICATIONS

This application is a continuation-in-part of prior U.S. patent application Ser. No. 14/087,900, filed Nov. 22, 2013, which is hereby incorporated herein by reference in its entirety. This application is also a continuation-in-part of prior U.S. patent application Ser. No. 13/837,738, filed Mar. 15, 2013, which claims the benefit of U.S. Provisional Patent Application No. 61/754,396, filed Jan. 18, 2013, and U.S. Provisional Patent Application No. 61/651,433, filed May 24, 2012, which are all hereby incorporated herein by reference in their entirety.

FIELD

This invention relates to fluid delivery and, more particularly, to conduits with fluid conduit connectors.

BACKGROUND

Traditional installations of dripline systems, especially larger grid type layouts, require a significant amount of the components to be assembled on site during installation. A typical dripline system requires a supply line to feed lateral extending driplines. A flusher line also is needed to flush the system. One approach is to use polyvinylchloride (PVC) pipe and fittings, such as T-fittings, to provide lateral connections for the driplines. A main drawback to this approach is that it requires a significant amount of labor, which increases the cost of such systems.

More specifically, the piping must be measured and cut, and the T-fitting must be attached. The cut end of the piping must be cleaned to remove any hanging chads of plastic hanging on to the cut end. The cut end outer surface of the piping and the inner surface of the T-fitting should be roughened for a better connection. Then, primer is applied to the roughened surface. After a short period of time, PVC glue is applied over the primer and the connection is made by turning one of the components into or onto the other.

In addition to increased costs, this approach creates potential for the grid to be unevenly created and can lead to plastic chads, dirt and other foreign debris getting into the system because the fabrication of the system typically occurs in the trenches where the lines will be buried. As a result, the system also must be flushed to clean any of the foreign debris.

There have been attempts to reduce the amount of labor required for installation with the use of special fittings, such as insert fittings or saddle tees, which tap into the piping. However, these methods still require a significant amount of labor in the field to install the special fittings and can lead to inaccurate spacing between the driplines and debris in the lines.

BRIEF DESCRIPTION OF THE DRAWINGS

FIG. 1 is a perspective view of a main supply line with lateral driplines;

FIG. 2 is a perspective view of a lateral connector with a cap attached thereto and the main supply line being transparent;

FIG. 3 is a partially exploded perspective view of the lateral connector of FIG. 2 with the main supply line being transparent;

FIG. 11 is a cross-section view of a third alternate embodiment of a lateral connector attached to the main supply line;

FIG. 12 is a cross-section view of a fourth alternate embodiment of a lateral connector attached to the main supply line;

DETAILED DESCRIPTION OF THE PREFERRED EMBODIMENTS

Figure 4:
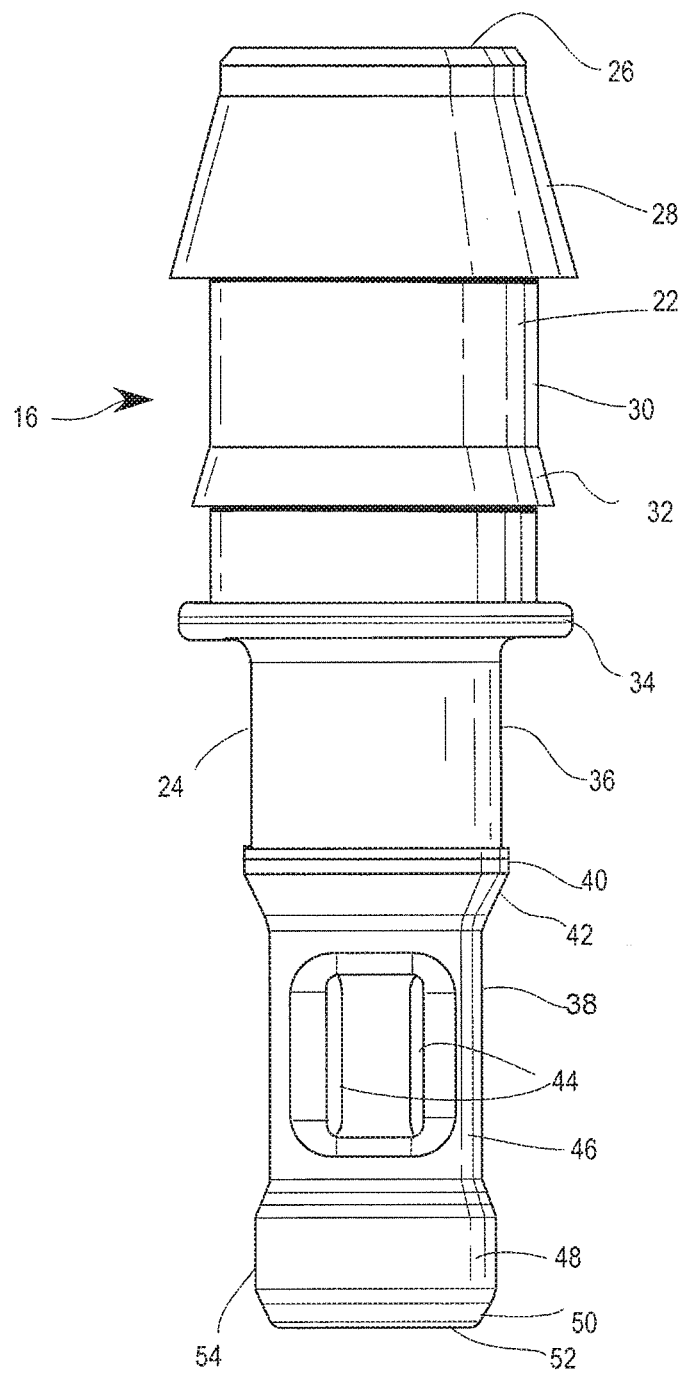
FIG. 4 is a side elevational side view of the connector of FIG. 2.

As illustrated in FIG. 1, there is shown a preassembled main supply line 10. The preassembled main supply line 10 reduces labor and improves installation by providing predetermined fitting locations where driplines can be attached. In addition to labor benefits, the predetermined spacing will improve accuracy of the irrigation system since measurements will not have to be carried out during installation. This will aid in providing an accurate installation of a dripline grid. It also will reduce the potential for plastic and other foreign dirt and debris to enter the main supply line during installation.

The main supply line 10 includes a series of pre-installed lateral connectors 12. Each connector allows a lateral line, such as a dripline 14, to be connected to the supply line 10. The connectors are typically spaced at equidistant intervals, such as 12 inches, along the supply line 10 to provide proper spacing for the driplines in the field. They, however, may be spaced at varying intervals, depending on the application. The main supply line 10 and driplines 14 may be buried for subsurface application of water or remain on the surface for topical application of water.

Referring to FIGS. 2 and 3, the lateral connector 12 is shown together with the main supply line 10. The main supply line 10 may be made of plastic, such as polyethylene, and may have any dimensions for its inside and outside diameters, including for example, an inside diameter in the range of 0.520 to 1.060 inches and an outside diameter in the range of 0.620 to 1.184 inches. The connector 12 will have to be sized according to the dimensions of the inside and outside diameter of the main supply line 10.

The connector 12 includes a connector body 16, a stabilization plug 18, and a protective cap 20. The components can be made from a sturdy, break-resistant plastic, such as high-density polyethylene. The connector body 16 has a connector segment 22 extending laterally from the outside of the supply line 10 and an inlet segment 24 extending laterally to the inside of the supply line 10. The connector segment 22 is configured to be inserted into and grip a lateral line, such as a dripline 14, to form a watertight connection. The connector segment 22 also is configured to be inserted into the protective cap 20. The supply line 10 is typically shipped in a spool like configuration so the cap 20 protects the supply line 10 from puncturing itself. The cap 20 also prevents debris from entering the connector 12 during field installation, which aids against clogging. The cap 20 is removed to attach driplines. The inlet segment 24 taps fluid from the supply line 10 for the dripline 14. The stabilization plug 18 is inserted through the supply line 10 on the side opposite of the connector body 16 and interconnects with the inlet segment 24 of the connector body 16. The plug 18 provides additional stability to the connector 12 by creating an additional constraint against wobbling.

Referring to FIG. 4, the connector segment 22 of the body 16 has a generally cylindrical shape defining an opening 26 at one end and a passage thereafter. The opening 26 provides an outlet for the fluid from the main supply line 10. On the exterior, the connector segment 22 includes an outer barb 28, an outer cylindrical body 30, an inner barb 32 and an outer stop collar 34. For example, the diameter of the opening 26 could be 0.512 inches, the diameter for the cylindrical body 30 could be 0.545 inches, and the diameter for the outer stop collar 34 could be 0.65 inches. The opening 26 opens to a passage through the cylindrical body 30.

The outer barb 28, the inner barb 32 and the outer stop collar 34 extend annularly around the outer body 30. The maximum diameter of the outer barb 28 preferably is larger than the maximum diameter of the inner barb 32, and the diameter of collar 34 preferably is larger than both the barbs 28 and 32. For example, the maximum diameters of the outer barb 28 could be 0.667 inches and the maximum diameter of the inner barb could be 0.59 inches. The depth of the outer barb 28 could be 0.061 inches and the depth of the inner barb 32 could be 0.023 inches. The axial length of the outer barb 28 could be 0.27 inches and the axial length of the inner barb 32 could be 0.09 inches.

The collar 34 provides a stop that engages a supply line when the connector has been inserted into the supply line and that engages the terminal end of a dripline being attached to the connector. The outer barb 28 and the inner barb 32 are spaced apart a predetermined distance that enables the outer barb 28 to provide the primary grip on the dripline and the inner barb 32 to provide a secondary grip on the dripline. If the barbs 28 and 32 are spaced too close together, the dripline will extend over the inner barb 32 due to the larger diameter of the outer barb 28 and not be gripped by the inner barb 30. For example, a spacing between the barbs 28 and 32 could be 0.25 inches.

The inlet segment 24 includes a first generally cylindrical segment 36 and a second generally cylindrical segment 38. The outside diameter of the first segment 36 is larger than the outside diameter of the second segment 38. For example, the outside diameter of the first segment 36 could be 0.415 inches and the diameter of the second segment 38 could be 0.355 inches. The two segments 36 and 38 are separated by an inner stop collar 40 with an inner annular cam surface 42. The length of the first segment 36 could be 0.28 inches, the length of the second segment 38 could be 0.375 inches, and the diameter of the stop collar 40 could be 0.451 inches. The first segment 36 has a smaller outer diameter than that of the connector segment 22. The diameter of the first segment 36 is sized so that it can be inserted into the preexisting holes in the supply line 10, while the connector segment 22 is sized to accommodate a dripline. The inner stop collar 40 circumscribes the transition between the first and second segments 36 and 38 and is beveled by the cam surface 42. The cam surface 42 assists with the insertion of the connector 16 into the hole of the line 10.

The second segment 38 includes at least one inlet port 44 and preferably three inlet ports 44. The inlet ports 44 are equally spaced from one another about the second segment 38. The ports 44 can be of any shape and preferably rectangular in shape. The area of the ports 44 is coordinated to provide the desired amount of fluid supply in the particular application. For example, the dimensions of a rectangular port could be approximately 0.25 inches by 0.112 inches. Each inlet port 44 is defined by an inlet port perimeter 46. The perimeter 46 could be rounded or angled to assist smooth intake flow. A passageway interconnects the ports 44 and the opening 26 to provide flow through the connector 12. By way of example, the passageway could have a minimum diameter of 0.19 inches and a maximum diameter of 0.438 inches.

The inlet segment 24 also includes a third segment 48 having an outer annular cam surface 50 and a plug opening 52 to receive the stabilization plug 18. By way of example, the maximum outer diameter of the third segment 48 could be 0.395 inches. The cam surface 50 also assists with insertion of the connector 16 into the supply line 10. The opening 52 extends through segment 48 to form a socket 54. The length of socket 54, for example, could be 0.112 inches.

As explained further below, the socket 54 includes a constriction that engages with the stabilization plug 18 to lock the plug 18 in the connector 12.

Figure 5:
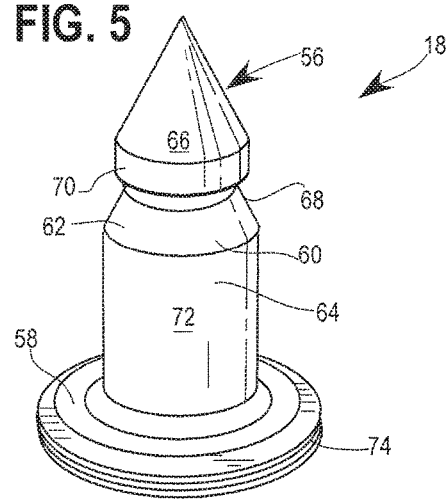
FIG. 5 is a perspective view of the plug of the connector of FIG. 2.

Referring to FIG. 5, the stabilization plug 18 includes at one end a conical tip 56 and at the other end a stop collar 58. In between these ends, there is a neck 60 and a cylindrical wall 64. The tip 56 is defined by a cam surface 66 that assists with insertion of the plug 18 into the connector 16. The neck 60 is between a retainer ledge 68 of the tip 56 and an annular stop surface 62. The ledge 68 has a lock surface 70 which steps into the neck 60. The annular stop surface 62 transitions to the neck 60 to the cylindrical wall 64, which has an outer surface 72. The wall 64 terminates at the stop collar 58 having a perimeter 74, preferably of circular configuration. As explained below, the ledge 68, the lock surface 70, the neck 60, the stop surface 62 and collar 58 lock the plug 18 in the socket 54 of the third segment 48 of connector 16. The overall length of the plug, for example, could be 1.92 inches, and the distance between the neck 60 and stop collar 58 could be 0.238 inches.

Figure 6:
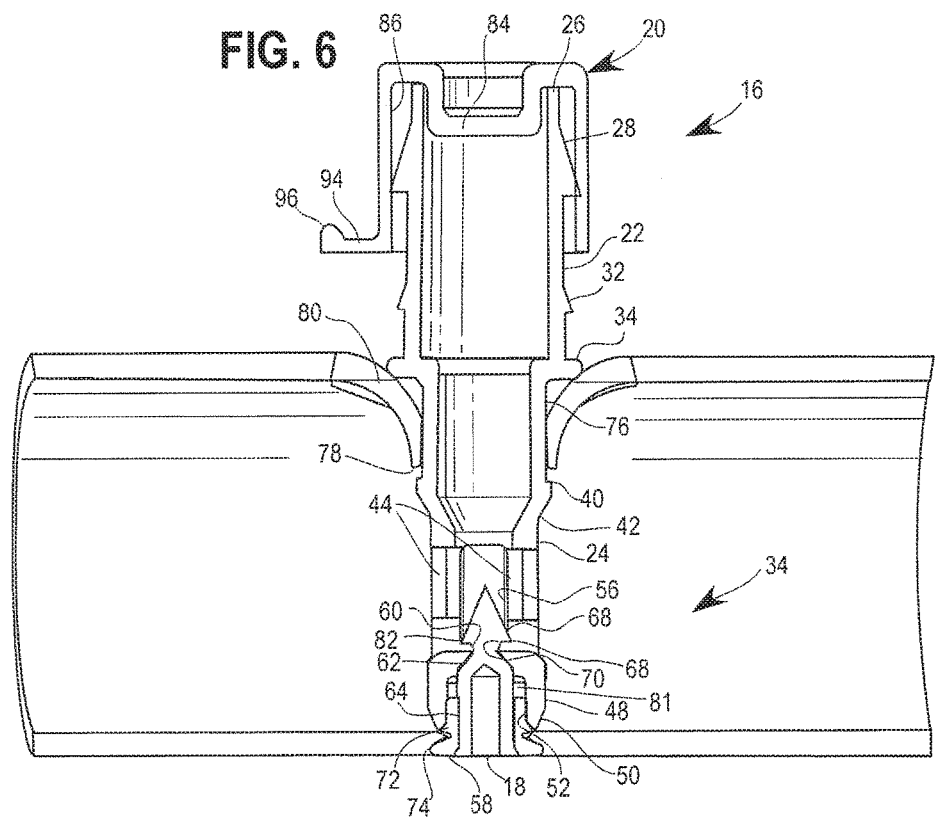
FIG. 6 is a cross-sectional view of the connector of FIG. 2 taken along line 2-2 of FIG. 2.

Referring to FIG. 6, to assemble the connector body 16 with the line 10, the connector 16 is inserted into the supply line 10 through an opening 76 formed in the existing main supply line 10. The opening 76 is preferably preformed in the supply line 10, such as by drilling or punching. The opening 76 is defined by an opening perimeter 78. The inner and outer annular cam surfaces 42 and 50 deflect the opening perimeter 78 and assist the connector 16 to pass through the opening 76. When the connector 16 has traveled a predetermined distance, such as approximately 1.08 inches, the outer stop collar 34 contacts the line 10 about the perimeter 78 of the opening 76 and prevents the connector 16 from traveling any further into the line 10. The inner stop collar 40, adjacent to the inner cam surface 42, prevents the connector 16 from being removed from the line 10. A supply line wall 80 about the perimeter 78 lies between the inner collar 40 and the outer collar 34. The perimeter 78 and adjacent area about the opening 76 forms a seal against the first segment 36 of the inlet segment 24 to prevent water from leaking.

The stabilizing plug 18 extends through the wall of line 10 into the socket of the plug segment 48. The opening 76 in the line 10 can be prefabricated, such as by drilling or punching, to accommodate the plug, or the tip 56 can create an opening by puncturing line 10 itself. The cam surface 66 of the tip 56 creates a wedge to deflect a perimeter 81 and a surrounding wall of the line 10 at the plug opening 52 to assist in inserting the plug 18. The constriction in the socket 54 is bound by an annular protrusion 82 extending into the socket 54. The surface 66 also deflects the annular protrusion 82 to widen the annular protrusion 82 so the ledge 68 can pass through and the neck 60 receives the annular protrusion 82 to lock the plug 18 in the socket 54.

The stop collar 58 prevents the plug 18 from being inserted too far into the connector 16. During insertion, the plug 18 also draws the wall 80 of the line 10 about the plug opening 52 into the socket 54 to create a seal. Once the lock surface 70 moves past the protrusion 82, the opening created by the annular protrusion 82 adjusts to more of the size of the neck 60 since now the neck 60 receives the protrusion 82. The smaller opening created by the protrusion 82 secures the tip 56 in place since it is sandwiched between the larger diameter ledge 68 and the annular stop surface 62.

The cap 20 on the connector segment 22, having a wall 84, is installed over the connector 16 and the outer barb 28. The outer barb 28 presses outward on the inside of the cap wall 84 to grip the cap. The inner diameter of cap 20 is slightly smaller than the maximum diameter of the barb 28. For example, the inner diameter of the cap may be 0.62 inches, and the maximum outer diameter of the outer barb may be 0.667 inches. The wall 84 stretches around barb 28 and creates a snug fit, holding the cap 20 in place over the connector 16. A recess 86 in the top of cap 20 sits within the connector opening 26 and creates a seal around the opening 26. The cap 20 can be removed or left installed, for example, when the connector will not be used for a lateral dripline.

Figure 7:
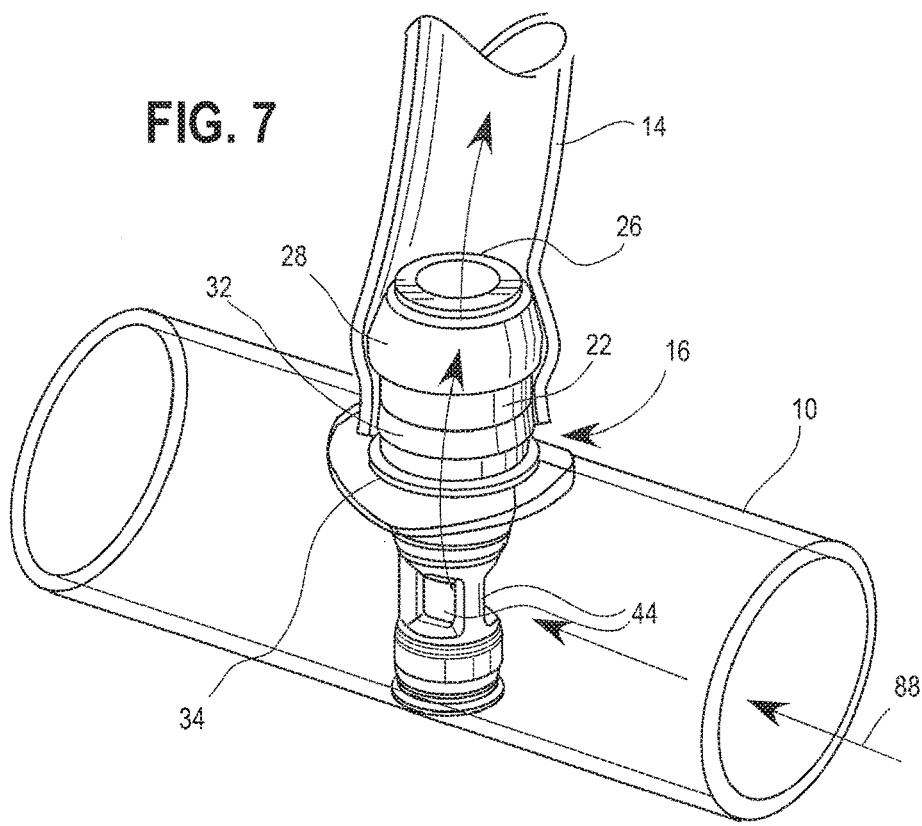
FIG. 7 is a perspective view of the lateral connector of FIG. 2 with the cap removed and a lateral line connected thereto and the main supply being transparent.

Referring to FIG. 7, the connector 16 and the supply line 10 are shown with the cap 20 removed. The cap 20 can be left installed if a particular connector 16 does not need to be used, but to install a lateral line, such as a dripline, the cap 20 is removed. The dripline 14 is press fit onto connector segment 22. The barbs 28 and 32 press outward on dripline 14 because the inner diameter of dripline 14 is slightly smaller than the maximum diameters of barbs 28 and 32. The dripline 14 stretches around the barbs 28 and 32 and the outer edge of the barbs 28 and 32 grips the dripline to hold it in place on the connector 16. The gripping should be sufficient enough that a predetermined pressure in the system, depending on the application, will not burst the connection. For example, for typical irrigation applications, the connection should be able to withstand at least a supply pressure of 50 psi. The stop collar 34 prevents the dripline from being pressed too far onto the connector 16.

Water or an appropriate fluid flows along the path 88 through main supply line 10 and into the inlet ports 44. The inlet ports 44 are positioned within the line 10 to intake the appropriate flow for the desired application and allow the remainder of the fluid to flow past in order to feed other connectors 12 where appropriate. Fluid flows through the ports 44 into the connector body 16. From the body 16, fluid flows into the dripline 14 through the opening 26.

Figure 8:
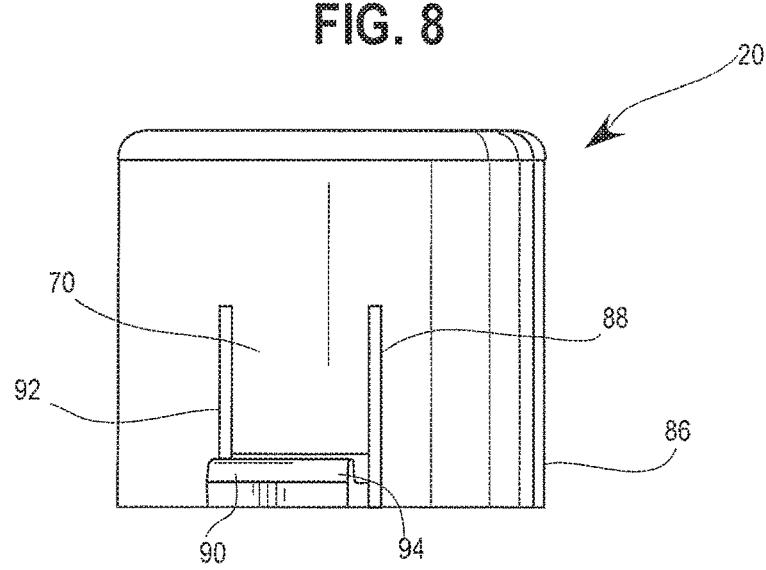
FIG. 8 is an elevational view of the cap of the connector of FIG. 2.

Referring to FIG. 8, the cap 20 has a tear strip 90 that is bounded on two sides by frangible connections 92. The tear strip 90 has a handle 94 that protrudes radially from the cap 20. The frangible connections 92 are a thin walled section of the strip 90, which can be formed in the cap wall 84 during molding or by later removal of material. When the handle 94 is pulled away from the cap 20, stress occurs with the material breaking at the weakest or thinnest areas, being the frangible connections 92. This enables the strip 90 to separate from the cap 20 as the frangible connections 92 tear upward. The handle 94 has a gripping rib 96 attached at its outer end, which assists the user to grasp the handle and apply force to separate the strip 90. Separating the strip 90 from the cap 20 enables the cap wall 84 to flex radially outward. Since the wall 84 can now flex outward around barb 28, the compression fit around the outer barb 28 is released, and the cap 20 can be removed.

During manufacturing, the main supply line 10 maybe be extruded and then the holes for the connector 12 and stabilization plug 18 may be formed, by drilling or punching, on diametrically opposite sides of the supply line 10. Next, the connector 12 and plug 18 are inserted into their respectable holes and locked together. The connector 12 and plug 18 may be inserted in series or simultaneously. The line 10 is then coiled and packaged. The preferred method of manufacture is where all steps are automated and performed in a single in-line process. Alternatively, the steps could be done in different off-line processes and/or some could be done manually.

Figure 9:
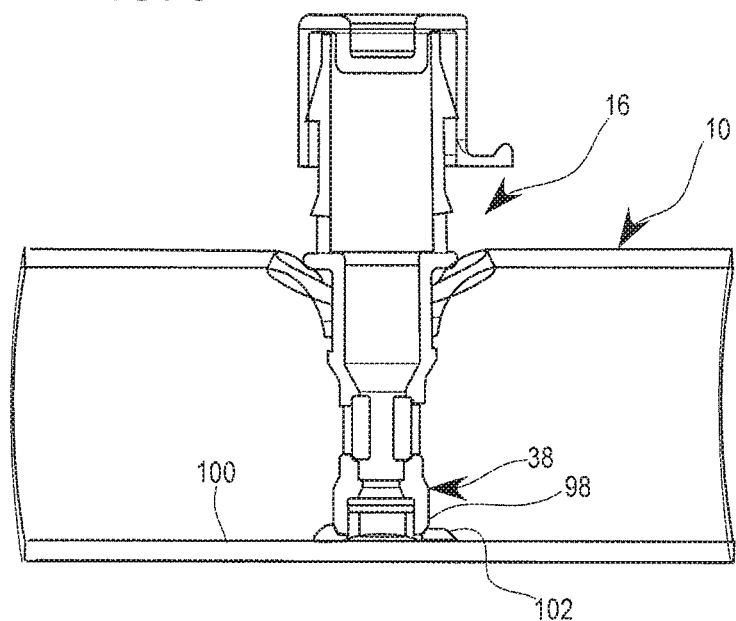
FIG. 9 is a cross-section view of an alternate embodiment of a lateral connector attached to the main supply line.
Figure 10:
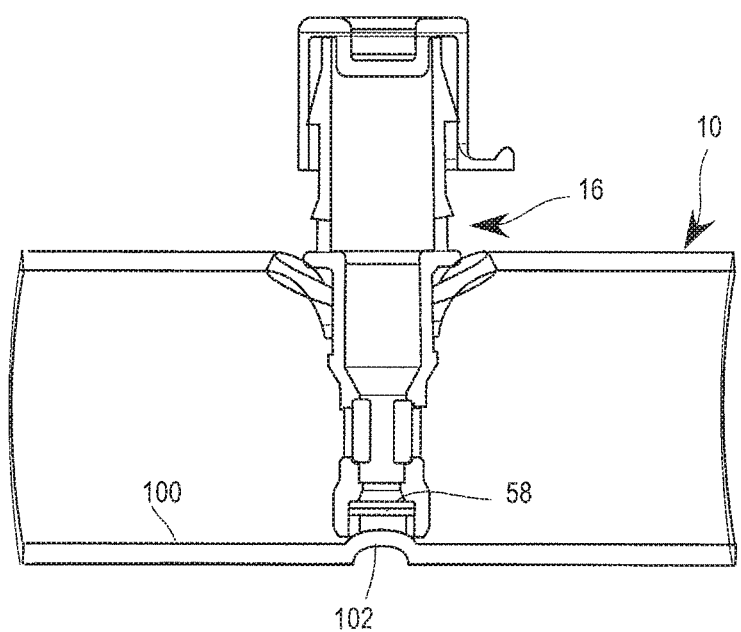
FIG. 10 is a cross-section view of a second alternate embodiment of a lateral connector attached to the main supply line.
Figure 13:
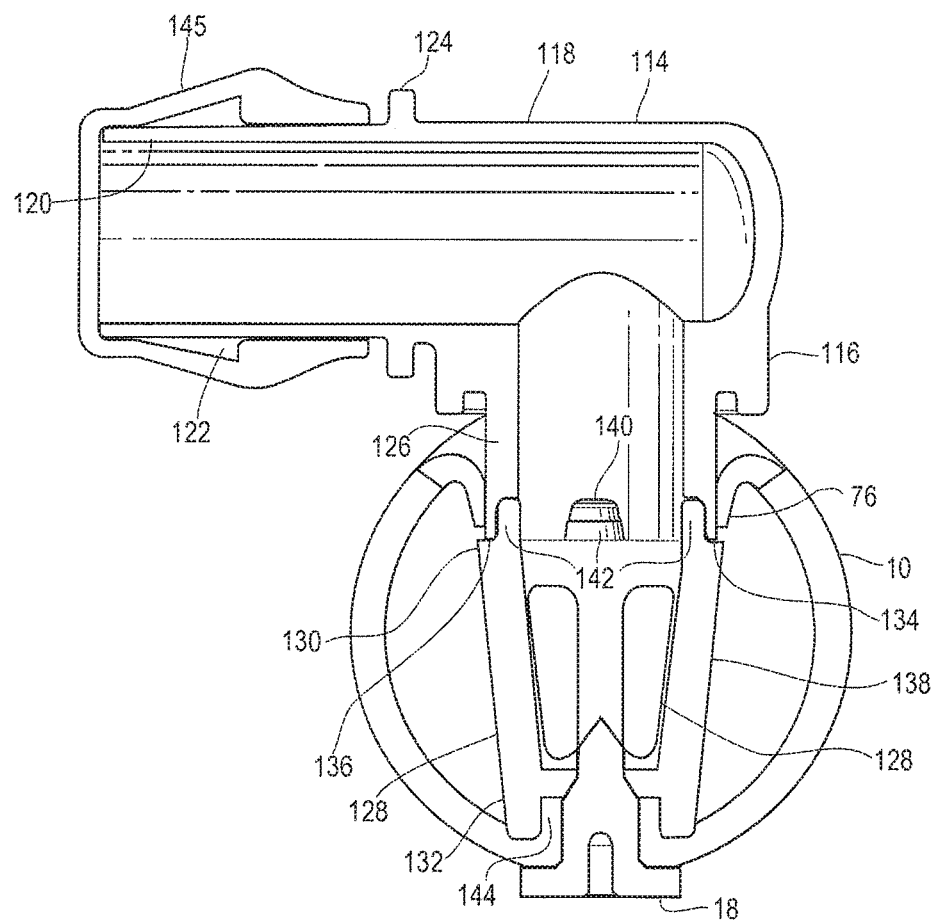
FIG. 13 is a cross-section view of a fifth alternate embodiment of a lateral connector attached to the main supply line.
Figure 14:
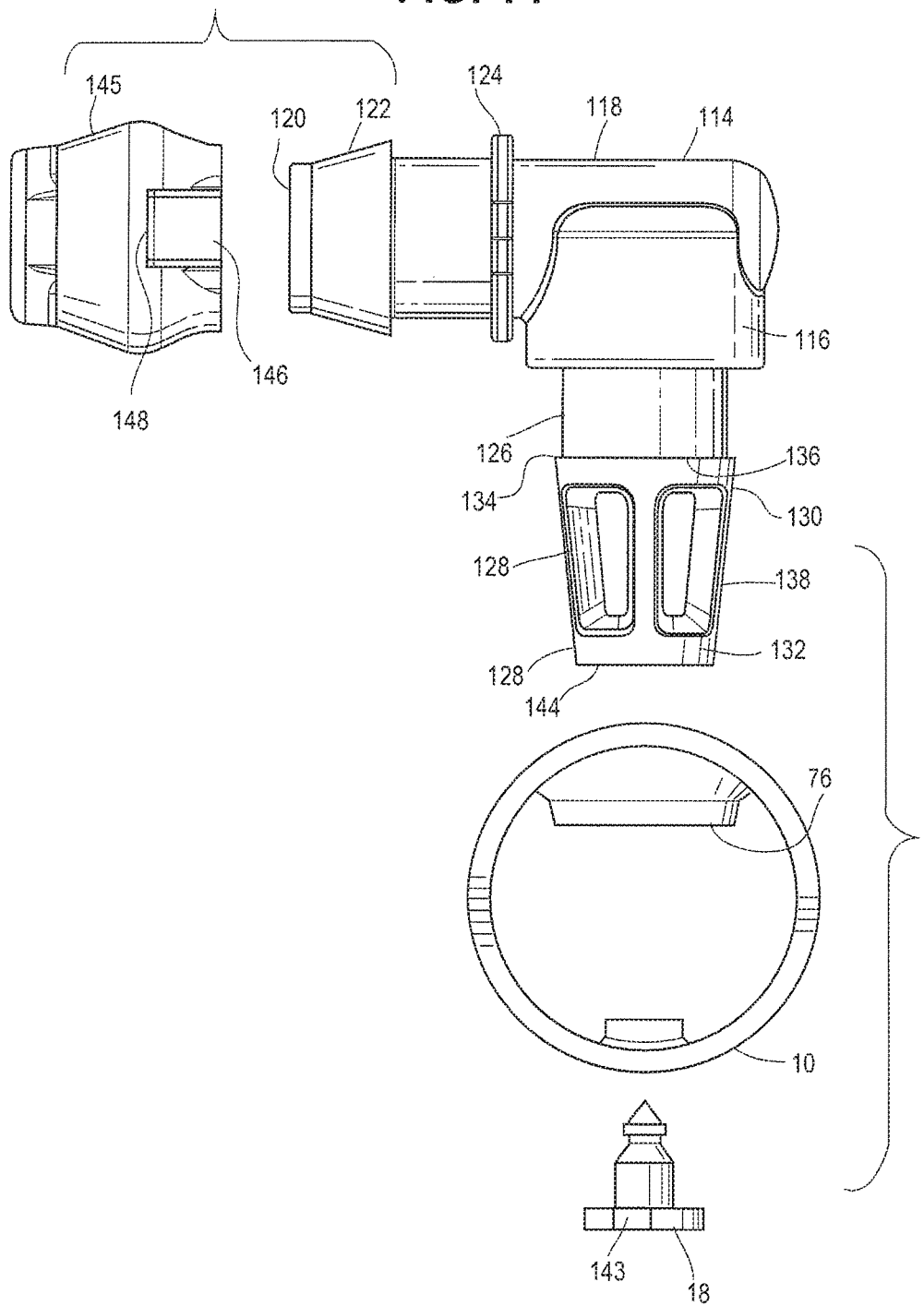
FIG. 14 is an exploded side elevation view of a lateral connector with the main supply line.
Figure 15:
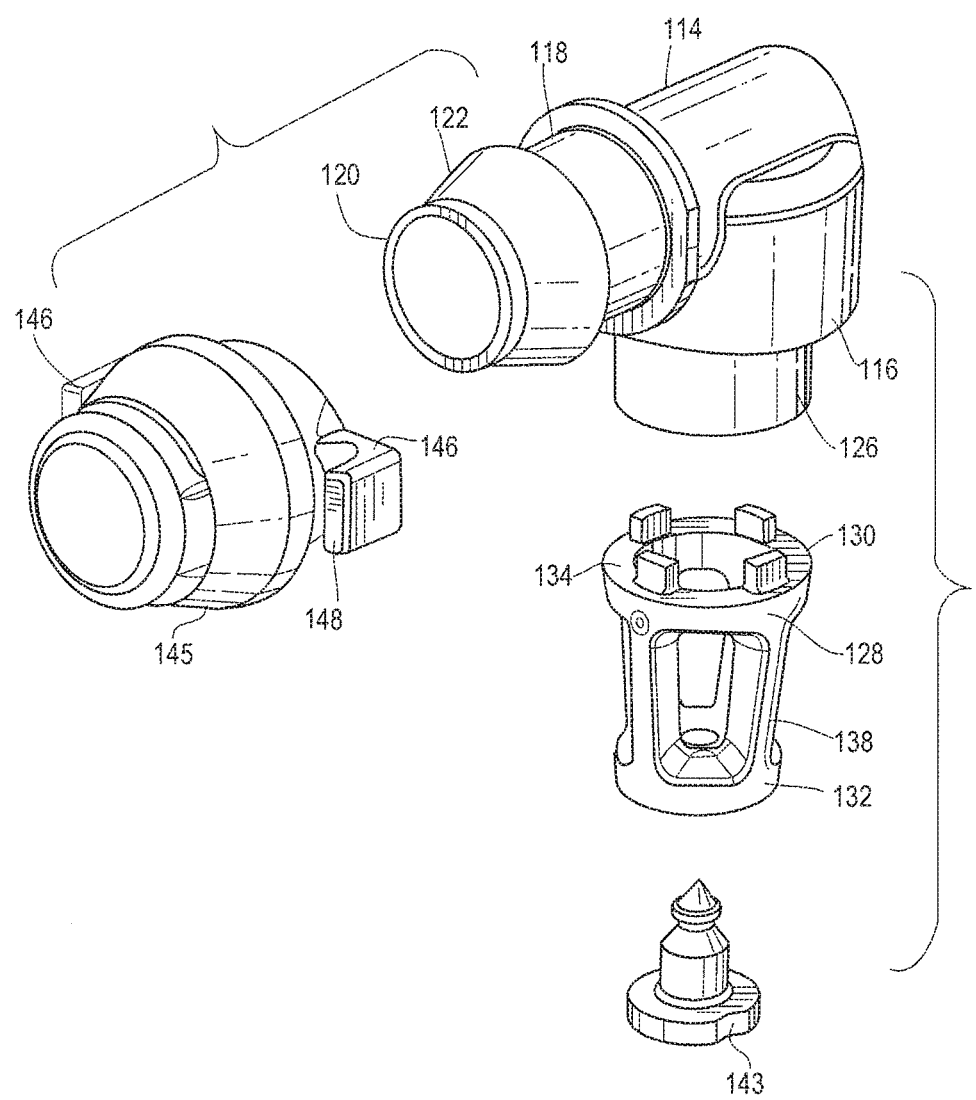
FIG. 15 is an exploded perspective view of the lateral connector of FIG. 13.
Figure 16:
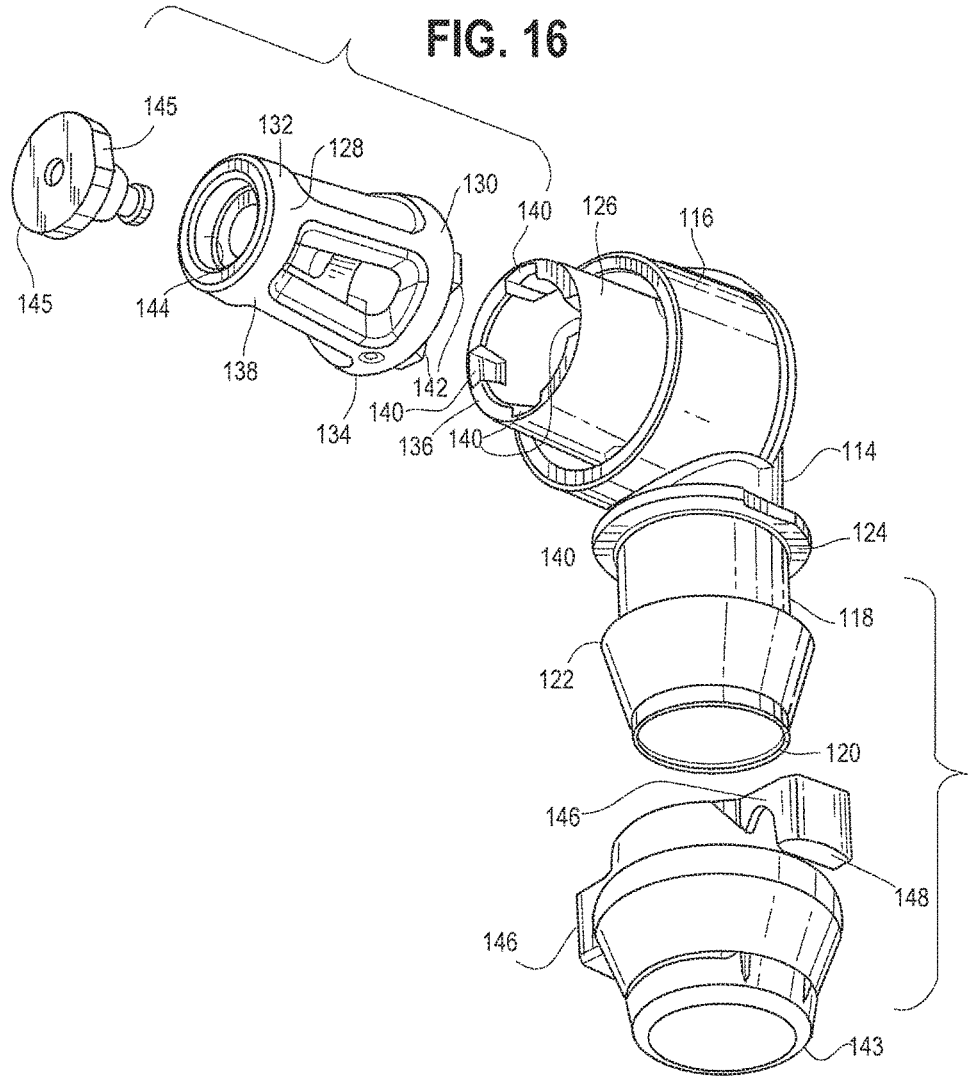
FIG. 16 is an exploded perspective view of the lateral connector of FIG. 13.

Alternatively, the connector body 16 could be used without the stabilization plug 18. In one embodiment, a distal end 98 of the segment 38 may be staked to an inside surface 100 of the line 10. It may be welded or glued 102 to the inside surface 100. In such case, the socket 58 is not necessary, and the end of the connector body may be a surface used to weld or glue the connector body 16 to the line 10 (see FIG. 9). As another alternative, a portion 102 of the wall of the line 10 may be formed so to insert into the socket 58 to stake the connector body 16 (see FIG. 10).

Another alternate embodiment of the connector body 16 is shown in FIG. 11. With this embodiment, the segment 38 includes a stake 104 that has a pointed end 106 that pierces the wall 100 of line 10 upon insertion of the connector body 16. There is no need to pre-form a hole for the connector body on either side of the line 10. Alternatively, pilot holes may be made to assist the piercing, if desired, or pre-formed holes may be used as desired. The stake 104 may be molded as a single piece with the connector body 16, or it can be welded or glued to the connector body 16. Once extended through the wall 100, the pointed end 106 can be peened, such as by ultrasonic staking or heat staking. This process may connect the pointed end 106 to a flat head like configuration, such as the head 112 shown in FIG. 12.

A further embodiment is shown in FIG. 12. In this embodiment, the segment 38 includes a plug 108 that is forced through a hole pre-formed in the wall 100 of the line 10. The plug 108 includes a neck 110 and head 112. The neck 110 is preferably slightly smaller in diameter than the hole, while the head 112 is larger in diameter than the hole. The distance between the head 112 and the stop collar 34 is coordinated, preferably, to be approximately the outer diameter of the line 10. The portion of the wall 100 defining the hole seals around the neck 110 and against the head 112. The plug 108 may be molded as a single piece with the connector body 16, or it can be welded or glued to the connector body 16.

A further embodiment is shown in FIGS. 13, 14, 15 and 16. In this embodiment, a connector body 114 has a 90 degree configuration with an inlet segment 116 extending perpendicularly from the supply line 10 and a connector segment 118 extending perpendicularly to the inlet segment 116. This configuration provides flexibility in installation solutions. The connector body 114 can be rotated within the opening 76 about 360 degrees, allowing an opening 120 of the connector segment 118 to face in any direction in its plane of rotation. The ability of the body 114 to rotate provides the flexibility for driplines to be attached on either side of the supply line 10, which could be desirable to simplify installation. A dripline also could be attached at a wider range of angles with respect to the supply line 10, which would enable a dripline to be laid out in a variety of non-conventional patterns, such as angled and non-repeating.

The connector segment 118 includes an outer barb 122 and an outer stop collar 124. The outer barb 122 and the outer stop collar 124 extend annularly around the segment 118. The dimensions of the outer barb 122 are the same that described before. The collar 124 provides a stop that engages a supply line when the connector segment 118 has been inserted into the supply line and that engages the terminal end of a dripline being attached to the connector. The outer diameter of the collar 124 is the same as that described before. The outer barb 122 provides the primary grip on the dripline.

The inlet segment 116 includes a first generally cylindrical segment 126 and a second conical segment 128. The conical segment 128 has a large portion 130 and a small portion 132. The outside diameter of the first segment 126 has a smaller diameter than the large portion 130. The small portion 132 has a smaller diameter than the diameter of the large opening. For example, the outer diameter of the first segment 126 could be 0.55 inches, the outer diameter of the large portion 130 could be 0.6 inches, and the outer diameter of the small portion 132 could be 0.454 inches.

The surface between the large portion 130 and the first segment 126 defines a ledge 134. The ledge 134 prevents the connector 114 from being removed from the line 10. Downstream of the ledge 134, the first segment 126 also has a second ledge 136 that can engage the outside of the tube 10. The distance between the ledges 134, 136 is designed to be coordinated with the length of the inward formed tube material and the thickness of the tube. It is preferred to eliminate as much play as possible to provide a good seal and secure engagement at the insertion. The small portion 132 is sized so that it can be inserted into the preexisting holes in the supply line 10, while the connector segment 118 is sized to accommodate a dripline. A cam surface 138 joins the large portion 130 and small portion 132. The cam surface 138 assists with the insertion of the connector 114 into the hole of the line 10.

The first segment 126 includes four pockets 140 extending from the terminal end along the inner surface. The second segment 128 includes four tabs 142 extending from its terminal end. The tabs 142 fit into the pockets 140 to orient the second segment 128 with regards to the first segment 126. This also creates a press-fit joining the first segment 126 to the second segment 128. The first segment 126 and the second segment 128 also may be welded together at this point by any conventional method such as heat or sonic welding. They also may be bonded together by an adhesive. The height of the pocket 140 could be 0.095 inches, the width could be 0.125 inches, and the depth could be 0.050 inches. The height of the tab 142 could be 0.085 inches, the width could be 0.120 inches, and the depth could be 0.045 inches.

The second segment 128 includes at least one inlet port 129 and preferably four inlet ports 129. The inlet ports 129 are equally spaced from one another about the conical segment 128. The ports 129 can be of any shape and preferably trapezoidal in shape. The area of the ports 129 is coordinated to provide the desired amount of fluid supply in the particular application. For example, the general dimensions of a port could be between approximately 0.185 inches by 0.250 inches and 0.235 inches by 0.475 inches. A passageway interconnects the ports 129 and the opening 120 to provide flow through the connector body 114. By way of example, the passageway could have a minimum diameter of 0.272 inches and a maximum diameter of 0.55 inches.

The second segment 128 supports a socket 144 at its terminal end. The socket 144 receives the plug 18 while securing the connection to the diametrically opposed side wall of the tube 10. This provides a secure attachment to the tube as discussed above. The plug 10 has two flattened surfaces 143 at the terminal end to provide a gripping surface. The flattened surfaces 143 allow the plug 18 to be handled more easily, assisting the assembly and installation of the plug 18 into the supply line 10.

Figure 17:
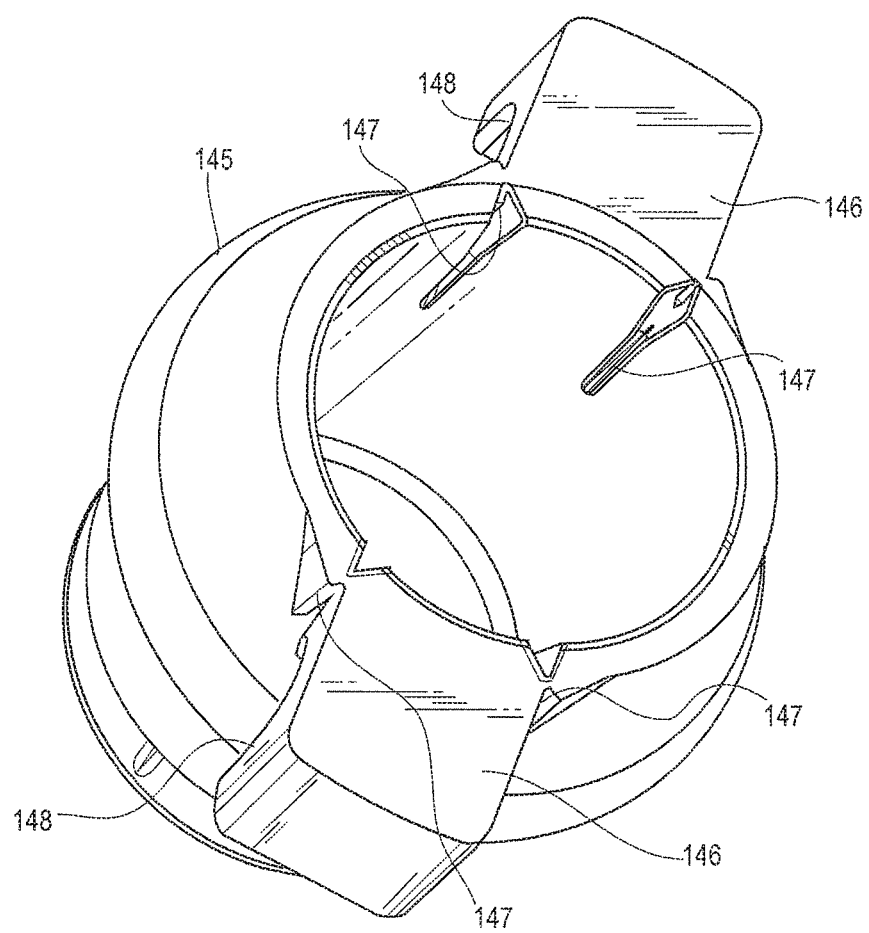
FIG. 17 is a perspective view of the cap of the lateral connector of FIG. 13.

Referring to FIG. 17, the cap 145 has two tabs 146. Each tab is defined by two frangible connections 147. Each tab 146 has a curved protrusion 148 that is shaped so that it can be gripped by a tool such as pliers. When the tool is rotated, the tab 146 and the frangible connections 147 break. Doing this frees the cap 145 by releasing the compression fit around the barbs 122 as previously described. The ability to rotate the tab 146 eases the removal of the cap 145 because the user does need displace the tool to pull the tab 146 away from the cap 145. The user can instead use rotational leverage by rotating the plier head along the cap 145 while gripping the tab 146.

As with the initial embodiment, these alternative embodiments may be manufactured with the installation being done inline with forming the dripline or may be done offline after the dripline is formed.

With reference to FIGS. 18-21, another embodiment of a lateral connector 200 is shown. The supply line 10 may include the lateral connector 200 rather than the connectors discussed above. The connector 200 has a connector body 202 with a connecting segment 204 and an inlet segment 206 oriented at an approximately ninety-degree angle relative to each other. The connector body 202 includes a protector 210 having a protector member 212 and supports 214, 216. The protector member 212 extends about a barb 220 of the connecting segment 204 to protect the barb 220 during manufacture and transport supply line 10. The protector member 212 also protects the connecting segment 204 during installation of the supply line 10 onsite. For example, the protector member 212 inhibits sharp objects, such as a shovel, from cutting the barb 220 which could prevent a dripline from being securely connected to the connecting segment 204.

Figure 19:
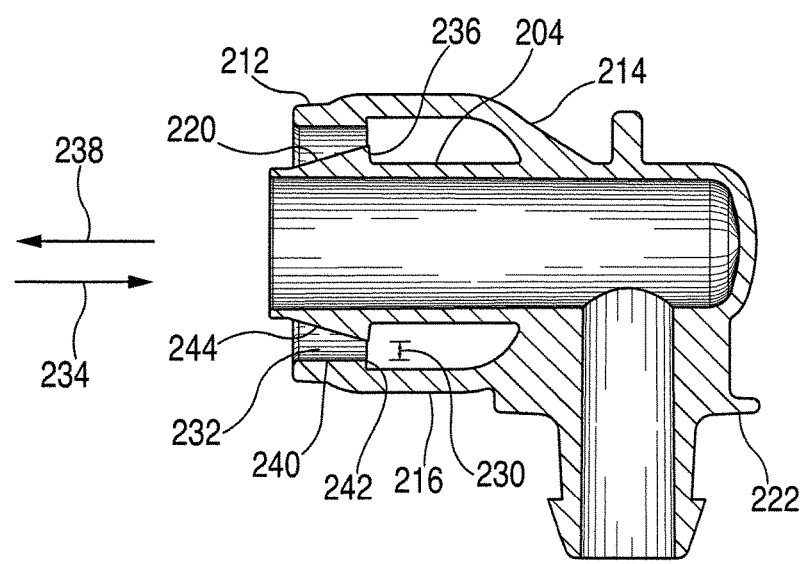
FIG. 19 is a cross-sectional view of the lateral connector of FIG. 18.
Figure 20:
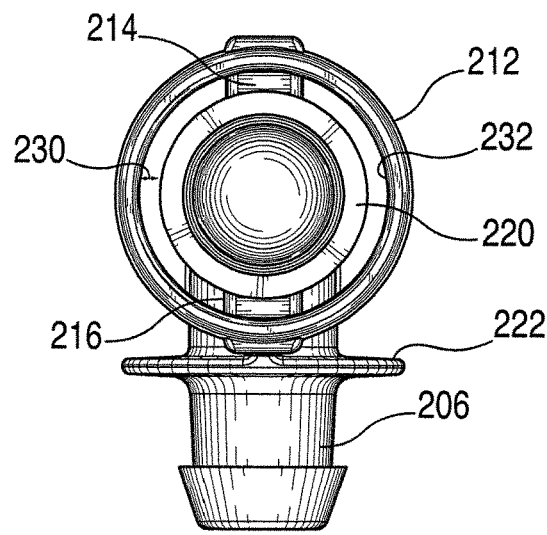
FIG. 20 is a front elevational view of the lateral connector of FIG. 18.

With reference to FIGS. 19 and 20, the protector member 212 and the barb 220 are separated by a distance 230 which forms a gap 232 sized to permit an end of the dripline 14 to be advanced in direction 234 between the protector member 212 and barb 220 and onto the connecting segment 204. The barb 220 has an outer cam surface 244 configured to expand an end portion of the dripline 14 as the dripline 14 is advanced in direction 234 over the barb 220. To retain the dripline 14 on the connector 200 once the dripline 14 has been fully advanced through gap 232 in direction 234, the barb 220 has an outer edge 236 configured to bite into an inner surface of the dripline 14 and restrict removal of the dripline 14 off of the connecting segment 204 in direction 238. The protector member 212 has a generally cylindrical inner surface 240 and an inner edge 242. In one form, the inner edge 242 may be configured to bite into an outer surface of the dripline 14 instead of, or in addition to, the barb 220 biting into the inner surface of the dripline 14.

Figure 21:
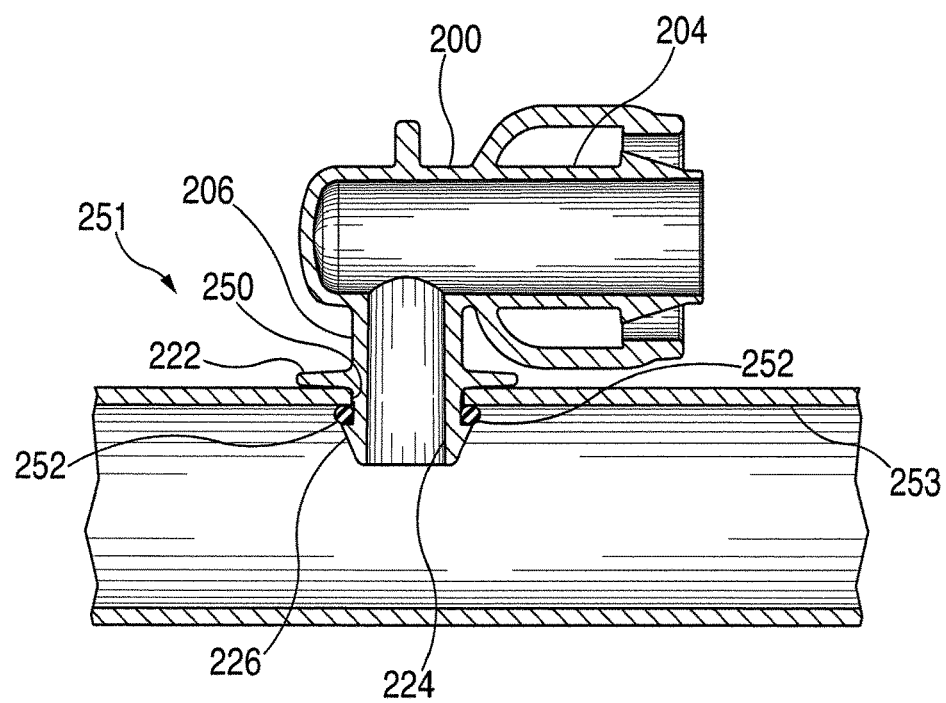
FIG. 21 is a cross-sectional view of the lateral connector of FIG. 18 connected to a main supply line.

With reference to FIG. 21, the connector 200 is shown attached to a main supply line 251 with the connector inlet segment 206 extending through a hole 250 in a sidewall 253 of the main supply line 251. The inlet segment 206 includes a stop collar 222, a cylindrical wall 224, and a barb 226. The stop collar 222 is configured to abut the main supply line 251 and restrict movement of the connector 200 into the main supply line 251, as shown in FIG. 21. The barb 226 and cylindrical wall 224 are configured to fit into the opening 250 with the barb 226 restricting removal of the connector 200 outward from the main supply line 251. The connector 200 has an o-ring 252 extending about the cylindrical wall 224 and engaging an interior surface of the sidewall 253 of the supply line 251. The o-ring 252 is held against the sidewall 253 between the barb 226 and the stop collar 222 and functions to provide a watertight connection between the connector 200 and the supply line 251. In another form, the connector 200 does not have an o-ring 252 and instead relies on the engagement between the tubular wall 224 and the sidewall 253 surrounding the opening 250 to provide a watertight seal.

Figure 18:
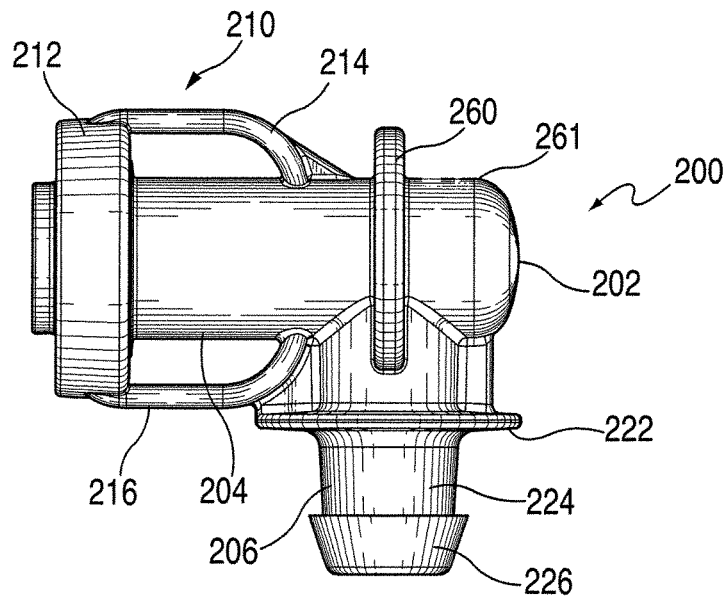
FIG. 18 is an elevational view of another embodiment of a lateral connector.
Figure 21A:
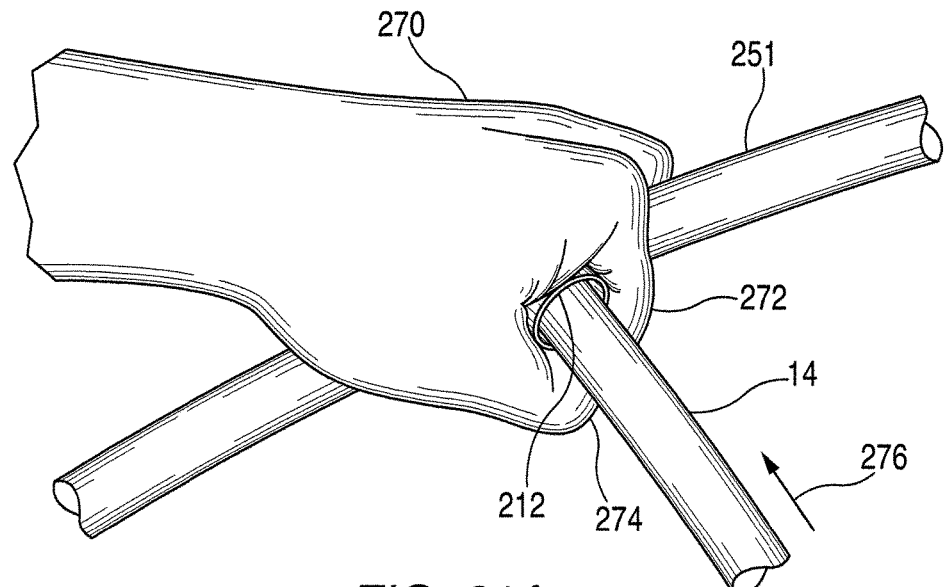
FIG. 21A is a schematic view of an installer connecting a dripline to the lateral connector of FIG. 18.

During installation, it may be difficult to advance the dripline 14 over the barb 220. The protector member 212 provides a rigid structure that the installer may grip while pressing, wiggling, or otherwise walking the dripline 14 over the barb 220 and onto the connecting segment 204. With reference to FIGS. 18 and 21A, an installer may position the palm of one of his hands 270 (see FIG. 21A) on an upper portion 261 (see FIG. 18) of the connector 200 with his index finger 272 and thumb 274 making an o-shape about the protector member 212. Next, the installer grasps the dripline 14 with his free hand and advances the dripline 14 in direction 276. The installer may thereby maintain a firm grip on the connector 200 while manipulating the dripline 14 as needed to connect the dripline 14 to the connecting segment 204.

Figure 22:
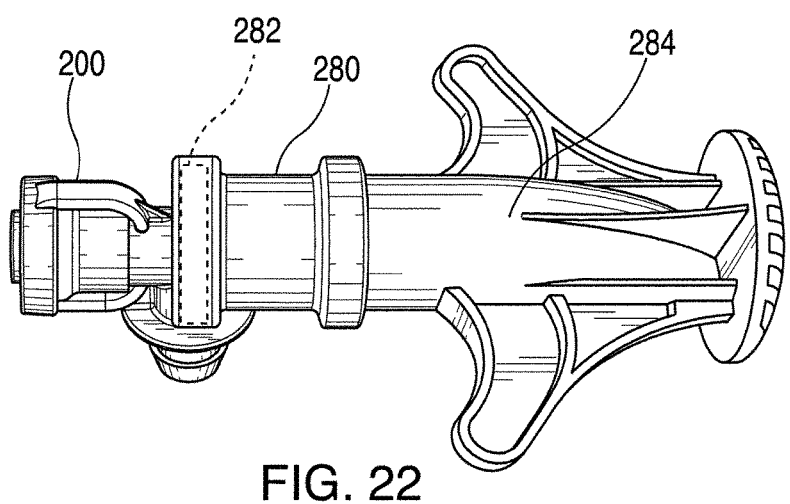
FIG. 22 is a perspective view of an installation tool engaged with the lateral connector of FIG. 18.

With reference to FIGS. 18 and 22, the connector 200 has a gripping flange 260 configured to be connected to an installation tool 280 to provide an alternative approach for grasping the connector 200. An exemplary installation tool 280 is described in U.S. Patent Application Publication No. 2012/0248759, which is hereby incorporated by reference in its entirety. More specifically, the installation tool 280 has an arcuate internal channel 282 sized and configured to snap onto and engage the gripping flange 260 of the connector 200. With the installation tool 280 engaged with the connector gripping flange 260, the installer can grasp a handle portion 284 of the tool 280 with one hand, grasp the dripline 14 with his other hand, and advance the dripline 14 over the barb 220. In this manner, the installation tool 280 provides a large, easy-to-grip handle portion 284 that makes the connector 200 easier to handle during installation of the dripline 14.

Figure 23:
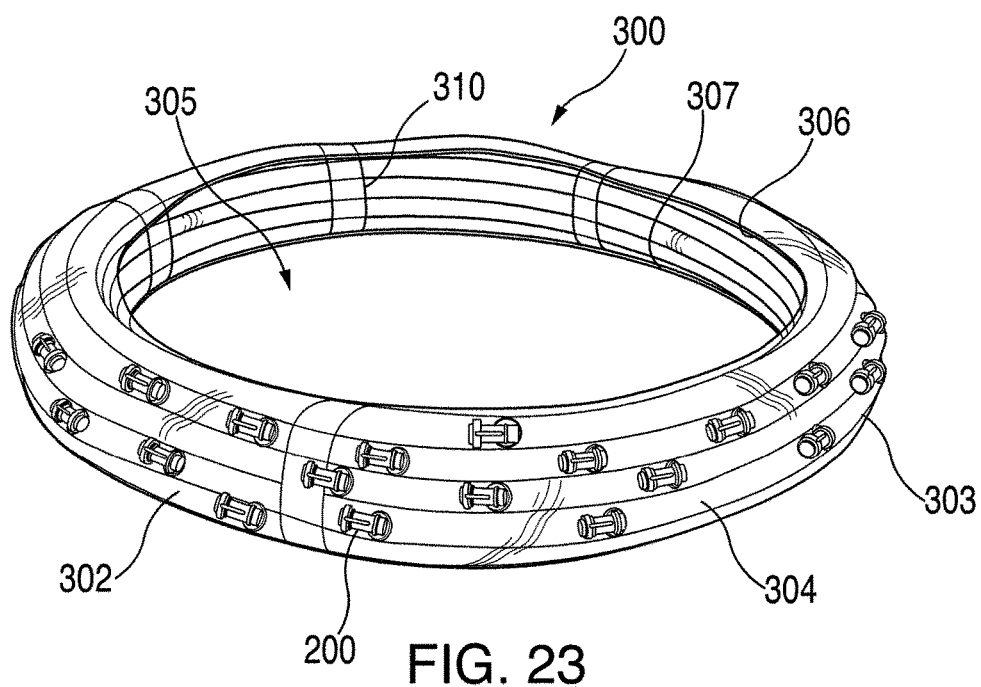
FIG. 23 is a perspective view of a preassembled main supply line including lateral connectors like the lateral connector of FIG. 18.
Figure 24:
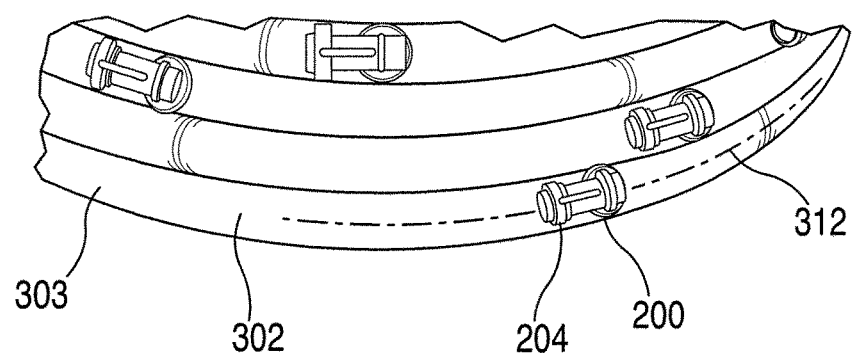
FIG. 24 is an enlarged perspective view of the preassembled main supply line of FIG. 23 with the outer wrap removed to show the orientation of the lateral connectors.

With reference to FIGS. 23 and 24, a preassembled main supply line 300 is shown having main supply tubing 302 and connectors 200. The tubing 302 is coiled about a central void 305 with coils 303 of the tubing 302 stacked on top of each other. The connectors 200 of the supply line 300 are positioned on an outside of the coils 303 rather than being positioned between the coils 303. In an alternative approach, the connectors 200 are positioned inside of the coils 303 in the central void 305. By positioning the connectors 200 on the inside or outside of the coils 303, the coils 303 rest upon each other without interference from the connectors 200. This minimizes the overall height of the coiled preassembled supply line 300 and improves transport of the preassembled supply line 300 such as by permitting a greater number of preassembled supply lines 300 to be loaded into a trailer of a semi-truck. The connectors 200 may be positioned on the inside or outside of the coils 303 by applying a torque to the tubing 302 while winding the tubing 302 into the coiled configuration shown in FIG. 23.

The supply line 300 also has an outer wrap 304 for maintaining the preassembled supply line 300 in the coiled configuration about the central void 305, as shown in FIG. 23. The outer wrap 304 includes upper and lower openings 306, 307 that are aligned with the central void 305. During assembly of the supply line 300, the tubing 302 is coiled about the central void 305 in a manner that permits the tubing 302 to be withdrawn from the central void 305 after coiling of the tubing 302. The outer wrap 304 is then applied to the coiled tubing 302.

An installer may transport the coiled (and wrapped) preassembled main supply line 300 to a first location and install a desired length of the tubing 302 (with a corresponding number of connectors 200 attached thereto) at the first location without having to remove the outer wrap 304. More specifically, the installer may withdraw a desired length of tubing 302 from within the central void 305, cut the length of tubing 302 from the coiled tubing 302, and install the cut tubing 302 (and connectors 200 thereon) at the first location. The installer may then transport the remaining coiled tubing 302 within the outer wrap 304 to a second location, withdraw a second length of tubing 302 (with a corresponding number of connectors 200 thereon) from the central void 305, cut and remove the second length of tubing 302, install the second length of tubing 302 at the second location, and repeat the process until all the tubing 302 has been dispensed and installed. Further, the preassembled supply line 300 may initially be held together in the coiled configuration using tape 310 as shown in FIG. 23. The installer would cut the tape 310 (but not remove the outer wrap 304) before withdrawing the first length of tubing 302.

With reference to FIG. 24, the connectors 200 are mounted on the tubing 302 such that the connecting segment 204 of the connectors 200 are oriented to extend along a longitudinal axis 312 of the respective coil 303 of the supply line 300. This orientation of the connecting segments 204 reduces the likelihood that the connectors 200 catch or otherwise interfere with nearby coils 303 or the outer wrap 304 as the coils 303 are withdrawn from the outer wrap 304.

Figure 25:
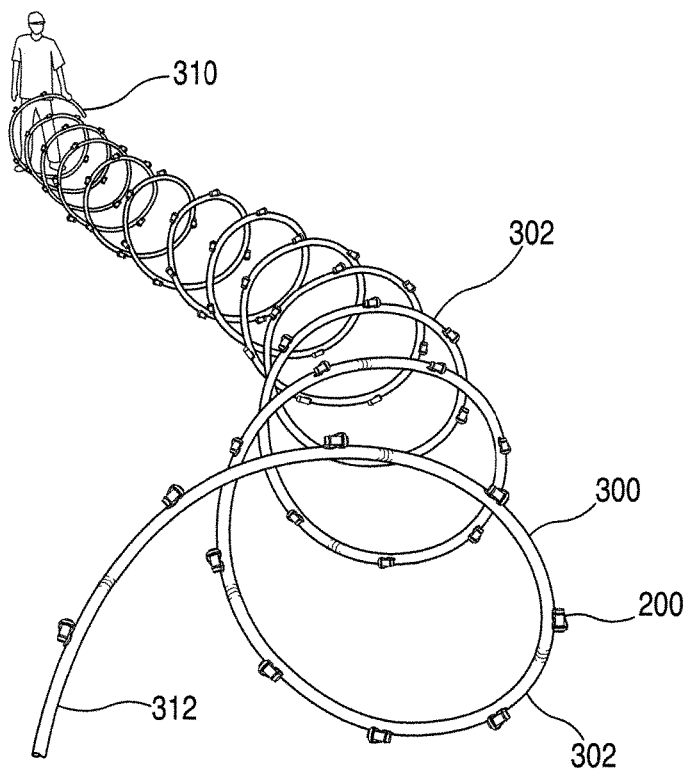
FIG. 25 is a schematic view of the preassembled main supply line of FIG. 23 after the supply line has been removed from the outer wrap.
Figure 26:
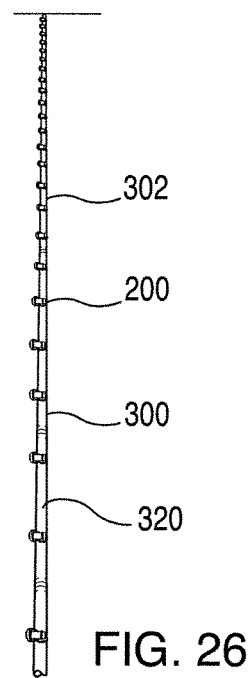
FIG. 26 is a schematic view of the main supply line of FIG. 25 showing the supply line pulled straight and the lateral connectors of the main supply line positioned along a common side of the supply line.

With reference to FIG. 25, removing the coiled tubing 302 from the outer wrap 304 produces a generally helical configuration of the tubing 302 with the connectors 200 attached thereto. Once the supply line 300 has been withdrawn from the outer wrap 304, the supply line 300 is positioned near the desired location for the supply line 300, such as a trench. Next, end portions 310, 312 of the supply line 300 are pulled apart to straighten the preassembled supply line 300, as shown in FIG. 26. The preassembled supply line 300 may be pulled taught into a substantially straight configuration and positioned in the trench. Driplines 14 may then be connected to the connectors 200 and the assembled supply line 300 and driplines 14 may be buried.

As shown in FIG. 26, the tubing 302 has an upwardly facing surface 320 and the connectors 200 are all positioned along the upwardly facing surface 320 and do not curl or wander about the tubing 302. This makes all of the connectors 200 easy to access during installation of the driplines 14 onto the connectors 200.

Figure 27:
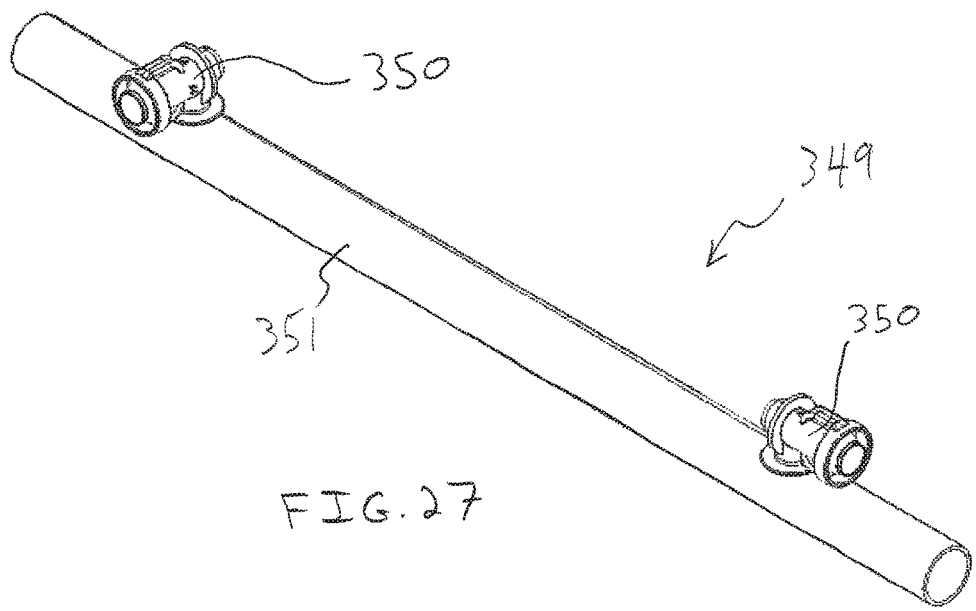
FIG. 27 is perspective view of a preassembled supply line having lateral connectors.
Figure 28:
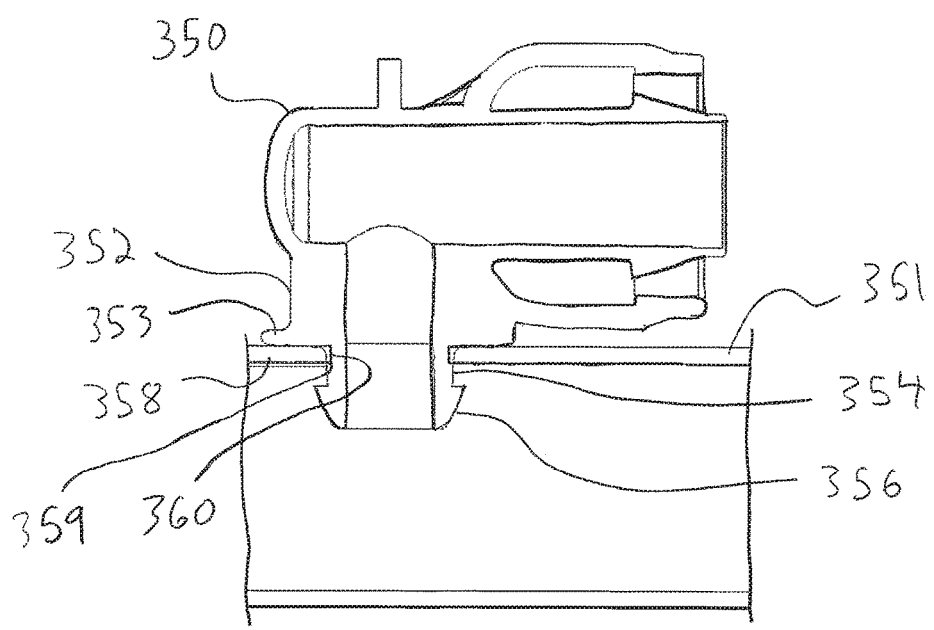
FIG. 28 is a cross-sectional view of one of the lateral connectors of FIG. 27.

With reference to FIGS. 27 and 28, a section of a preassembled main supply line 349 is shown. The supply line 349 is substantially similar to the supply line 300 except that the supply line 349 has tubing 351 with connectors 350 mounted thereon rather than connectors 200. Each connector 350 is substantially identical to the connector 200 except that the connector 350 has an inlet segment 352 with a cylindrical wall 354 that is shorter than the cylindrical wall 224. The connector 350 further includes a stop collar 353 and a barb 356. The shorter cylindrical wall 354 positions the barb 356 closer to a sidewall 358 of the supply line tubing 349. The preassembled main supply line 349 has an opening 359 formed in the tubing 351 without an inwardly extending portion of the sidewall 358. The shorter cylindrical wall 354 is sized to accommodate for this lack of an inwardly extending portion of the sidewall 358 by the positioning the barb 356 closer to the sidewall 358 and tightly engage the sidewall 358 between the collar 353 and the barb 356. The engagement between the connector cylindrical wall 354 and an edge 360 surrounding the opening 359 provides the primary sealing function between the connector 350 and the tubing 351. This sealing may be sufficient for some applications, such as low pressure applications.

Figure 29:
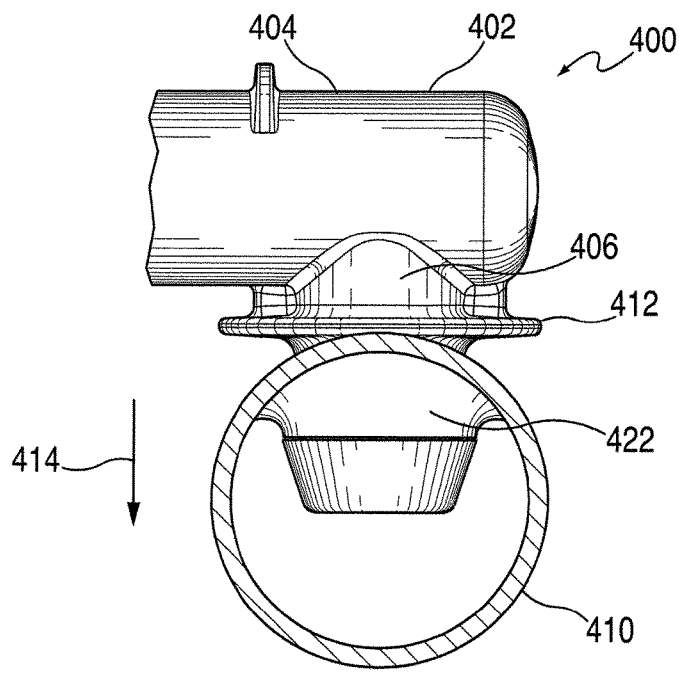
FIG. 29 is a side elevational view of another embodiment of a lateral connector attached to a main supply line.
Figure 30:
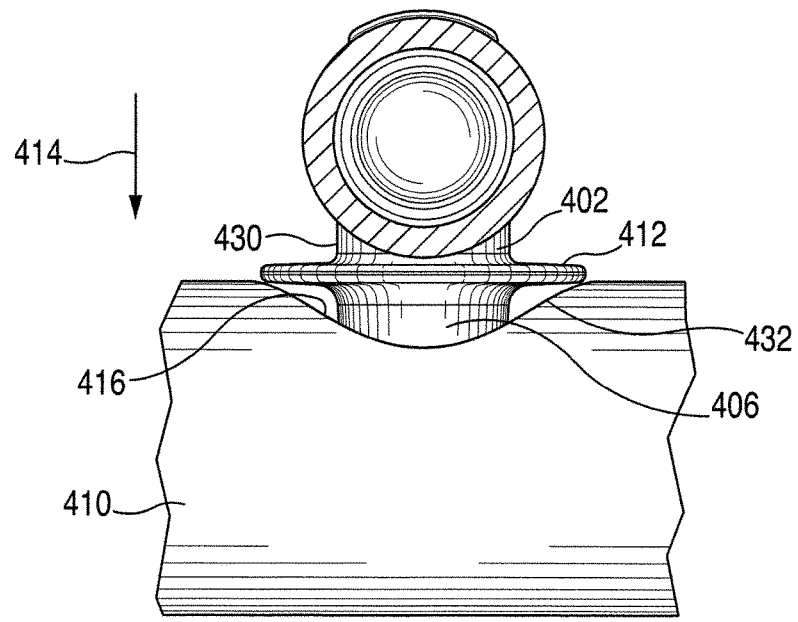
FIG. 30 is a front elevational view of the lateral connector of FIG. 29.

With reference to FIGS. 29-36, another embodiment of a lateral connector 400 is shown. As shown in FIGS. 29 and 30, the lateral connector 400 has a connector body 402 including a connecting segment 404 (the connecting segment 404 is truncated in the drawings to provide a less obstructed view of the connector body 402) for connecting to a dripline and an inlet segment 406 for connecting to a main supply line 410. In one form, the connector 400 has a protector and a connecting segment similar to the connector 200.

Figure 35:
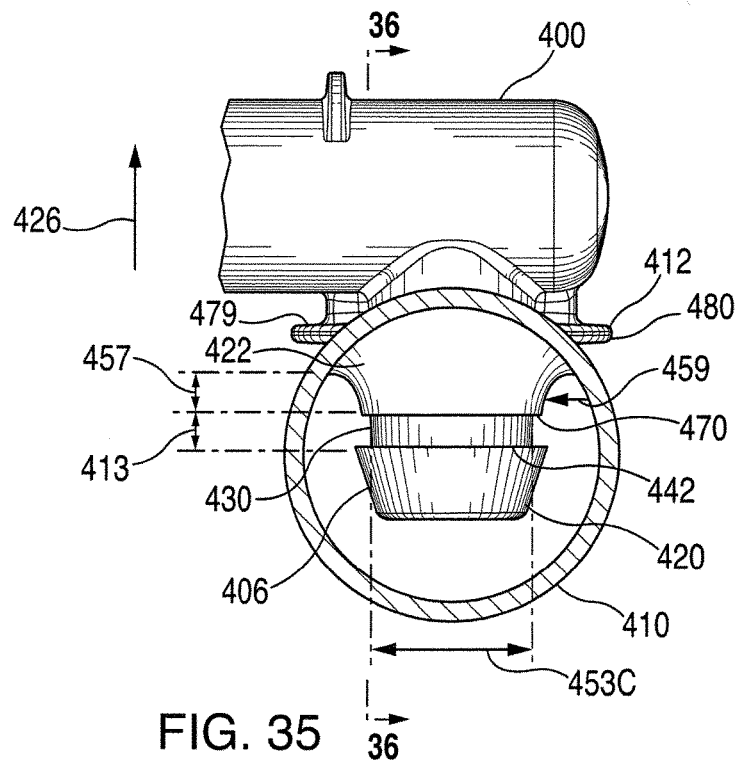
FIG. 35 is a side elevational view similar to FIG. 29 showing the lateral connector shifted downward into the supply line.

With reference to FIG. 30, the connector body 402 includes a tubular wall 430 and a deflectable stop flange 412 extending outward from the tubular wall 430. The deflectable stop flange 412 is positioned to engage and be deflected by the supply line 410 as the connection inlet segment 406 is advanced in direction 414 into an opening 416 of the supply line 410. With reference to FIG. 35, the flexing of the flange 412 permits a barb 420 of the inlet segment 406 to snap past an inwardly extending sidewall 422 of the supply line 410 a distance 413 beyond a rim or lower surface 470 of the sidewall 422. In one form, the flange 412 has resilient properties such that the deflected flange 412 biases the connector 400 upward in direction 426 in response to the flange 412 being seated against the sidewall 422 and the inlet segment barb 420 having been snapped beyond the sidewall 422. This biasing shifts the barb 420 back upward in direction 426 and decreases the distance 413 until the barb 420 engages the sidewall lower surface 470. In this manner, the connector 400 and flange 412 thereof provides a secure connection to the supply line 410 with a large tolerance window by taking up any tolerance variations between the connector 400 and the supply line 410 (i.e., by decreasing the distance 413). The biasing force provided by the deflected flange 412 also enhances the sealing between the supply line sidewall 422 and the connector inlet segment 406, as discussed further below.

Figure 31:
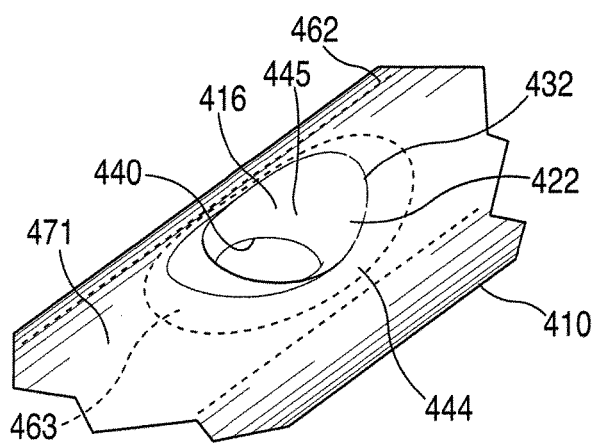
FIG. 31 is a perspective view of the supply line of FIGS. 29 and 30 showing an opening in the sidewall.
Figure 32:
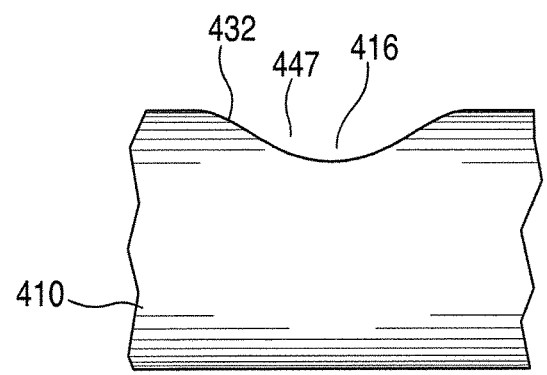
FIG. 32 is a side elevational view of the supply line of FIGS. 29 and 30.

With reference to FIG. 31, the supply line 410 has a saddle 432 extending about the opening 416. In one form, the supply line sidewall 422 extends inwardly to define a generally hyperbolic paraboloid-shaped saddle 432 with the opening 416 disposed at the center of the saddle 432. The saddle 432 includes a bend of the sidewall 422 that forms a rounded ridge 444 extending about an upper portion 447 of the opening 416 (see FIGS. 31 and 32). The rounded ridge 444 has a smooth radius as the sidewall 422 bends inwardly which provides a complimentary area 445 for engaging the flange 412 as the flange 412 seats against the saddle 432. The smooth radius of the rounded ridge 444 permits a relatively robust connection between the connector 400 and the supply line 410 by providing a large area 445 for engaging the flange 412 despite tolerance variation in the connector 400 and the supply line 410.

Figure 36:
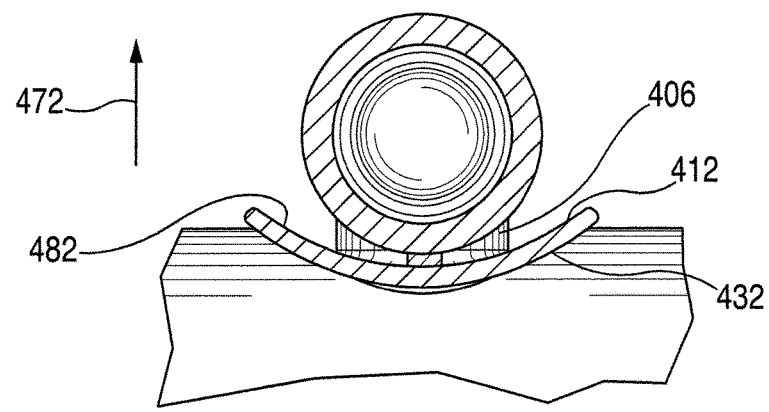
FIG. 36 is a cross sectional view taken across line 36-36 in FIG. 35.

The flange 412 may have varying amounts of deflection along the flange 412 as the inlet segment 406 is advanced into the supply line 410. For example, the flange 412 may have undeflected front and rear portions 479, 480 (see FIG. 35) and a deflected middle portion 482 (see FIG. 36). Further, the flange 412 is shown in FIG. 36 as being deflected along its entire width. In another form shown in FIGS. 36A and 36B, the saddle 432 has a larger, generally flat central region 485 and a smaller, curved outer region 487. Shifting the inlet segment 406 downward farther into the supply line 410 engages the flange 412 with the saddle 432, but due to the shape of the saddle 432, the flange 412 deflects only at outer portions 484, 485 (rather than along its entire width as in FIG. 36).

Figure 36A:
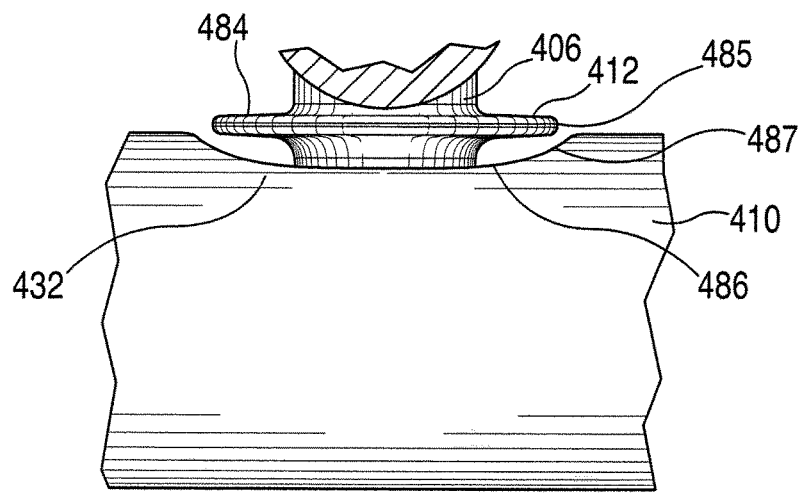
FIGS. 36A-36C are front elevational views similar to FIGS. 30 and 36 showing an alternative embodiment of the connector and a supply line.
Figure 36B:
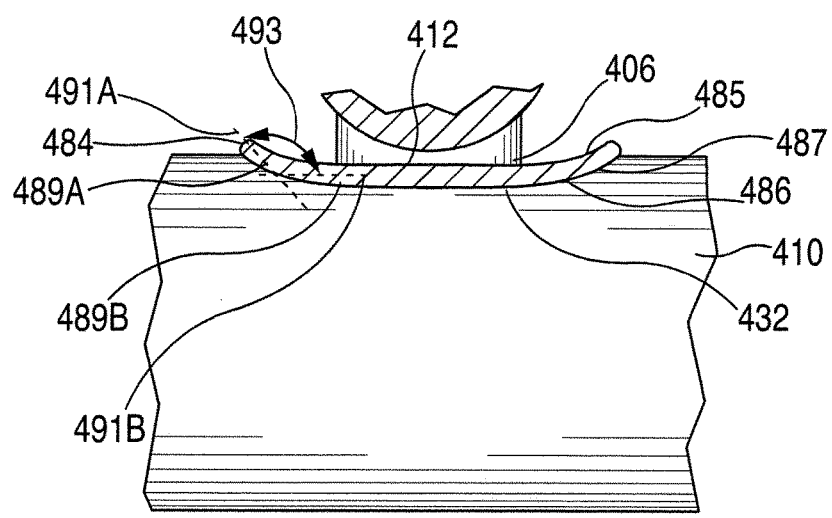
Figure 36C:
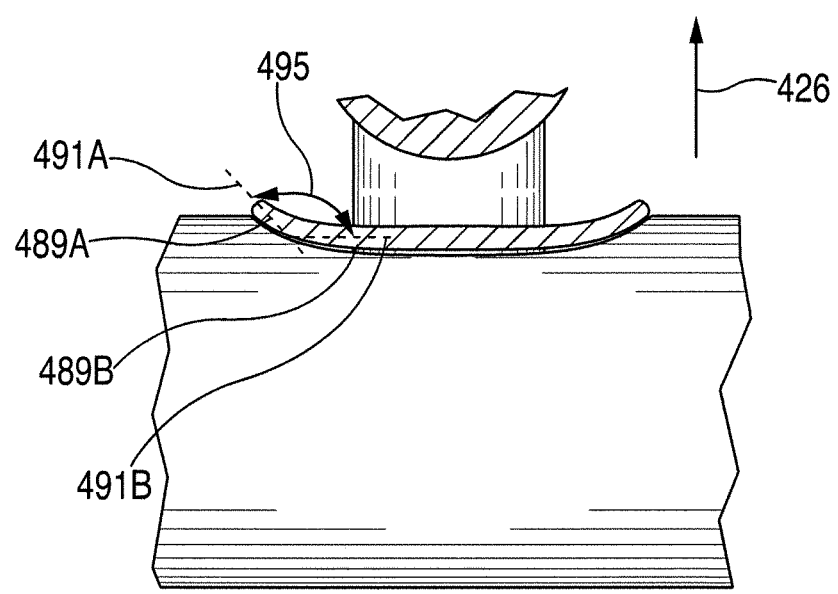

With respect to FIGS. 36A-36C, mounting the connector 400 to the supply line 410 (such as by an automated machine or individual) involves reconfiguring the deflectable flange 412 from an undeflected configuration (FIG. 36A), to a deflected configuration (FIG. 36B), and finally to an intermediate configuration (FIG. 36C).

More specifically, the inlet segment 406 is initially advanced part-way into the opening 416 to position the flange 412 above the saddle 432 with the flange 412 being in an undeflected configuration (see FIG. 36A). Next, the inlet segment 406 of the connector 400 is advanced fully into the opening 416 to snap the barb 420 of the inlet segment 406 beyond the sidewall 422 (see FIG. 35). This causes the flange 412 to engage the saddle 432 and deflects the flange 412 into the deflected configuration (see FIG. 36B). The flange 412 includes segments 489A, 489B that generally extend along respective axes 491A, 491B. Fully advancing the inlet segment 406 into the opening 416 deflects the segment 489A upward such that the axes 491A, 491B extend at an angle 493 relative to each other.

Once the inlet segment 406 has fully advanced into the opening 416 and the barb 420 has snapped beyond the sidewall 422 (see FIG. 35), the machine or individual mounting the connector 400 to the supply line 410 releases the connector 400. The resilient properties of the flange 412 cause the flange 412 to bias against the saddle 432 and shift the inlet segment 406 upwardly in direction 426, as shown in FIG. 36C. As discussed above, this upward movement of the inlet segment 406 engages the barb 420 with the sidewall 422 and takes up any tolerance variation between the connector 400 and the supply line 410.

The upward shifting of the inlet segment 406 due to the biasing of the flange 412 also permits the flange 412 to reconfigure to the intermediate configuration (see FIG. 36C) where the flange 412 is less deflected than in the deflected configuration (see FIG. 36B). With the flange 412 in the intermediate configuration, the segment 489A is less deflected relative to the segment 489B. This orients the segments 489A, 489B so that the axes 491A, 491B extend at an angle 495 relative to each other that is greater than the angle 493.

In one form, the flange 412 is configured to engage the supply line 410 and be deflected without collapsing the supply line 410 or deforming the saddle 432 beyond a predetermined amount. Stated differently, the force required to deflect the flange 412 and snap the barb 420 beyond the sidewall 422 is less than an amount of force that would collapse the supply line 410 or deform the saddle 432 beyond the predetermined amount. The connector 400 may be made of high-density polyethylene and the supply line 410 made of low-density polyethylene. Because the connector 400 is made from higher density polyethylene, the connector 400 tends to deform the supply line 410 (rather than the supply line 410 deforming the connector 400) during assembly of the connector 400 to the supply line 410. However, the flange 412 has a thin, disc shape that permits the saddle 432 to deflect the flange 412 as the inlet segment 406 advances into the supply line 410 before the saddle 432 deforms beyond a predetermined amount. In this manner, the material and shape of the flange 412 provides resilient properties that permit the barb 420 to snap beyond the sidewall 422 and bias the connector 400 upwardly to take up tolerance variation without collapsing or deforming the supply line 410 or saddle 432 beyond a predetermined amount.

Figure 31A:
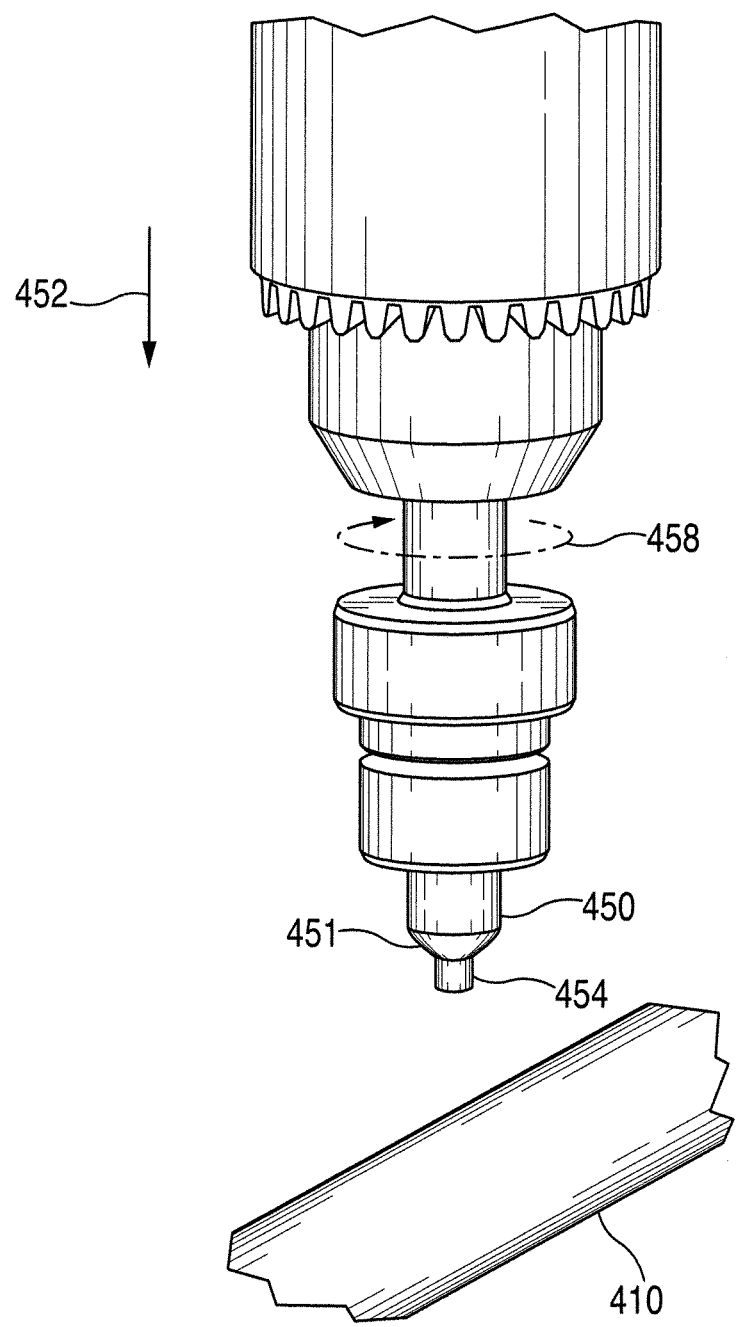
FIGS. 31A-31D are schematic views of a process of forming the sidewall opening of FIG. 31.
Figure 31B:
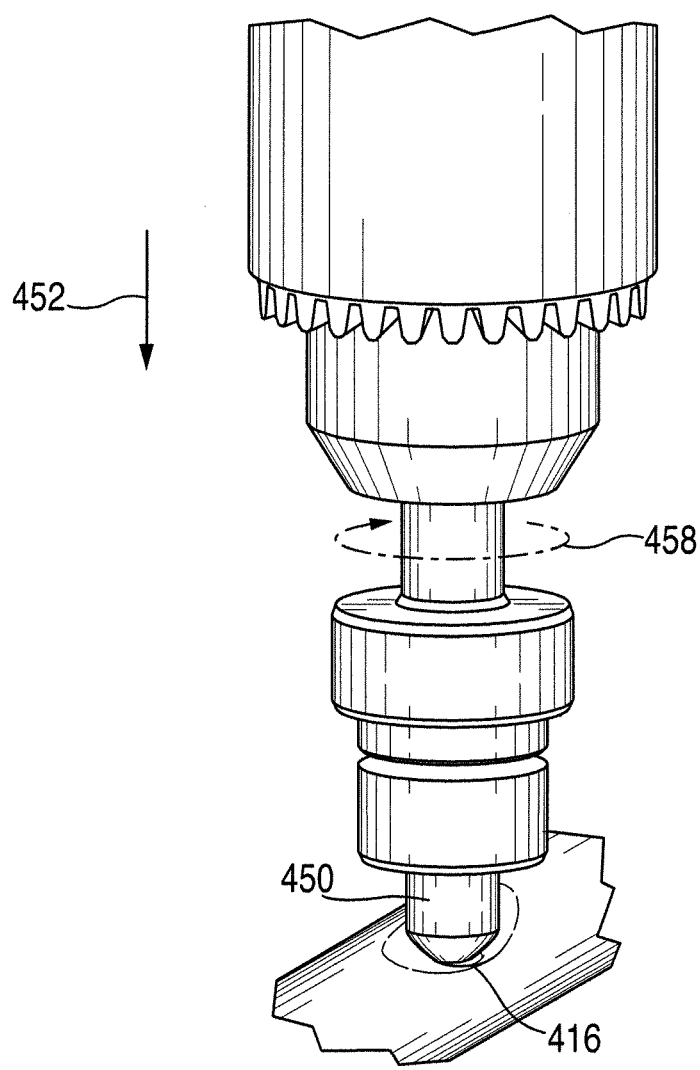

One approach for forming the opening 416 and saddle 432 in the supply line 410 is shown in FIGS. 31A-31D. This approach includes advancing a punch 450 in direction 452 toward the supply line 410. The punch 450 has tubular cutting end 454 and a rounded, outwardly tapering section 451 above the tubular end 456 as shown in FIG. 31A. The cutting end 454 initially pierces the sidewall 422 and forms a small opening 416 as the punch 450 is rotated in direction 458 and advanced in direction 452 into the supply line 410. The rounded, outwardly tapering section 451 gradually stretches and bends the sidewall 422 to enlarge the opening 416 as the punch 450 is further advanced into the supply line 410, as shown in FIG. 31B. The rounded, outwardly tapering section 451 causes the sidewall 422 to fold inwardly into the supply line 410 a distance 457 (see FIG. 35) which, in one form, is approximately 0.10 inches (once the forming operation is complete). Further, advancing the punch 450 in direction 452 stretches the sidewall 422 as the punch 452 travels into the supply line 410. This stretching causes the sidewall 422 to have a thickness near the lower surface 470 (see FIG. 35) that is approximately half the thickness of the sidewall 422 away from the opening 416 (such as at point 471 in FIG. 31).

Once the desired size opening 416 is formed (see FIG. 31C), the punch 450 is withdrawn from the supply line 410. The supply line sidewall 422 may have resilient properties such that the opening 416 is pierced and stretched to a predetermined distance thereacross in order to achieve a desired engagement of the supply line sidewall 422 despite constriction of the opening 416 after removal of the punch 450. In one approach, the sidewall 422 is bent inward and stretched until a lower portion 449 (see FIG. 31C) of the opening 416 has a diameter of 0.08 inches smaller than an outer diameter of the component received in the opening 416, such as the tubular wall 430 (see FIG. 35), and then the punch 450 is withdrawn from the opening 416. Although the sidewall 422 may partially constrict the opening 416 as the sidewall 422 returns back toward its undeformed state, the size of the opening 416 remains adequate to ensure sealing of the sidewall 422 against the inlet segment 406.

Figure 31C:
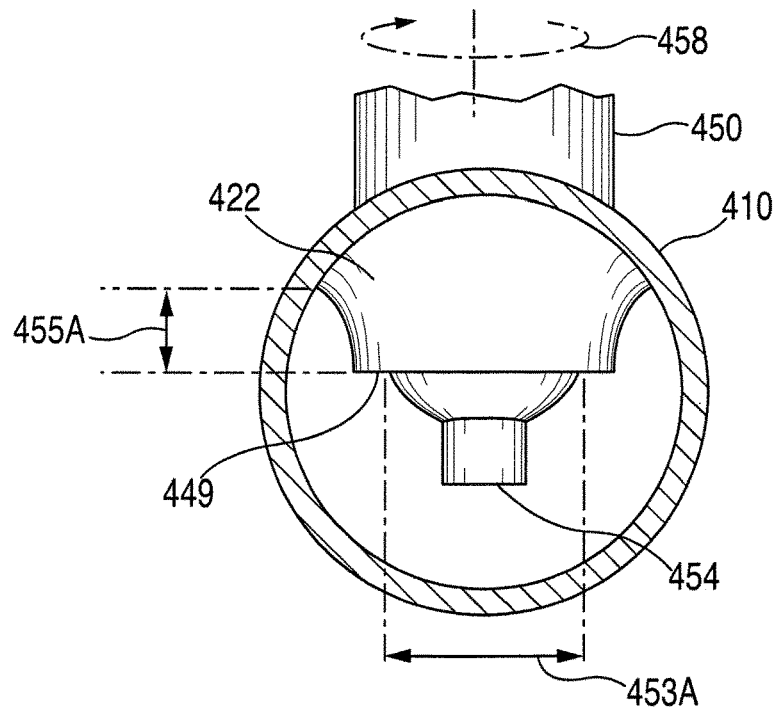
Figure 31D:
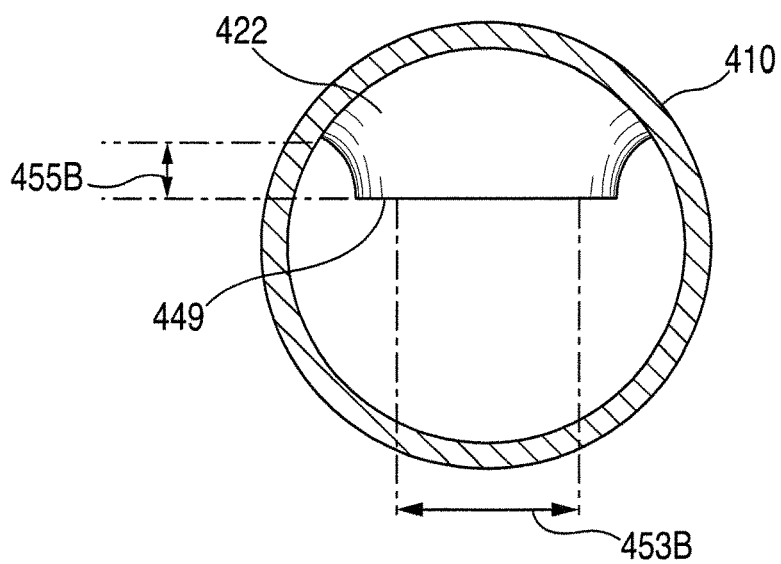

For example and with reference to FIGS. 31C and 31D, the rotating punch 450 may used to shape the opening 416 to receive a connector tubular wall 430 having an outer diameter of about 0.450 inches. The rotating punch 450 is advanced into the supply line 410 and the tubular cutting end 454 initially forms the opening 416 with a diameter of about 0.20 inches. With reference to FIG. 31C, the rotating punch 450 is further advanced into the supply line 410 to engage the rounded, outwardly tapering section 451 against the sidewall 422 and causes the outwardly tapering section 451 to bend and stretch the sidewall 422 until the lower portion 449 of the opening 416 has a distance 453A thereacross of about 0.370 inches and the sidewall 422 has been bent inward a distance 455A greater than about 0.01 inches. Once the punch 450 has been withdrawn, the resilient properties of the sidewall 422 cause the opening lower portion 449 to contract to a distance 453B thereacross less than about 0.370 inches and the sidewall 422 retracts to a distance 455B of about 0.01 inches within the supply line 410.

With reference to FIG. 35, the inlet segment 406 is sized to stretch or deflect the sidewall 422 from the configuration of FIG. 31D once the barb 420 has been snapped beyond the sidewall 422. Specifically, the opening lower portion 449 has a distance 453C (see FIG. 35) that is larger than the distance 453B once the barb 420 has snapped beyond the sidewall 422. By having the inlet segment 406 sized to slightly stretch or deflect the sidewall 422, the resilient properties of the sidewall 422 tend to bias the sidewall 422 against the inlet segment 406 and contribute to a watertight seal therebetween.

In one approach, the process of forming the saddle 432 is performed shortly after the supply line 410 has been extruded and before the supply line 410 fully cools and hardens. In another approach, the process of forming the saddle 432 may be performed after the supply line 410 has fully hardened and may rely on the ductile properties of the material(s) of the supply line 410.

With reference to FIG. 35, there are generally three sealing operations occurring between the connector 400 and the supply line 410 when pressurized liquid is introduced into the supply line 410. First, the pressurized liquid within the supply line 410 exerts an inward force in direction 459 on the supply line sidewall 422 which tightly engages the sidewall 422 against the inlet segment 406 of the connector 400. Second, the pressure within the supply line 410 tends to shift the connector 400 upward in direction 426 and brings an upper surface 442 of the barb 420 into engagement with the lower surface 470 of the inwardly extending sidewall 422. Third, the deflected flange 412 biases the inlet segment 406 upward in direction 472 due to the resilient characteristics of the flange 412 (see FIG. 36) as discussed above. The biasing force produced by the deflected flange 412 therefore operates in combination with the pressure in the supply line 410 to tightly engage the barb upper surface 442 against the sidewall lower surface 470. These three sealing operations together provide a watertight and robust connection between the connector 400 and the supply line 410.

Figure 33:
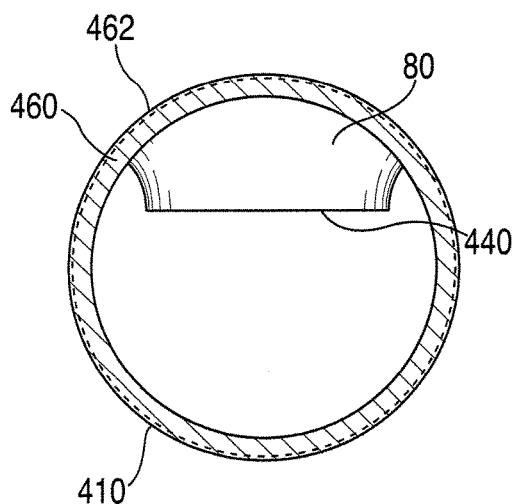
FIG. 33 is cross-sectional view of another embodiment of a main supply line.
Figure 34:
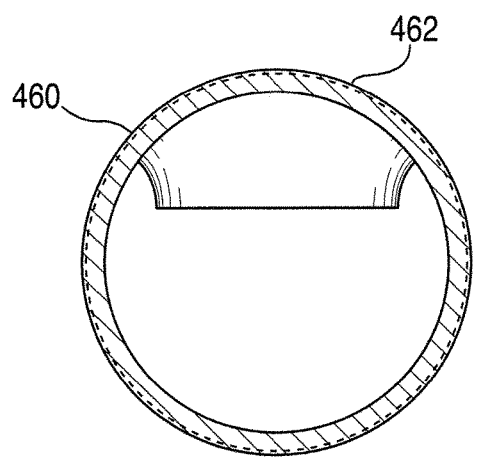
FIG. 34 is cross-sectional view of another embodiment of a main supply line.

In one form, the main supply line 410 may be formed by extruding a single layer of virgin material, such as polyethelene (see supply line 410 in FIG. 29). With reference to FIG. 33, the supply line 410 may alternatively be formed by coextruding a first layer 460 including recycled material with a strip of a second layer 462 of virgin material. The recycled material may be post-consumer material, such as 40%, 60%, 80%, or 100% post-consumer polyethelene. The recycled material may include some virgin material to aid in processing or, as a further variation, may include different recycled materials. The second layer 462 is preferably a known virgin material without contamination, such as 100% virgin polyethelene. Because recycled material, such as post-consumer polyethelene, has contamination that can cause depressions and imperfections in its outer surface, the recycled material of the first layer 460 may provide a level of sealing with the connector flange 412 that is not sufficient for certain applications. By using the second layer 462 of virgin material for the region of the sidewall 422 about the opening 416, the second layer 462 provides a smooth, uninterrupted outer surface without the potential for depressions and imperfections of the first layer 460 that could affect sealing. In this manner, the second layer 462 provides the smooth uninterrupted outer surface for sealing with the connector inlet segment 406 while the first layer 460 permits the utilization of recycled material which reduces the amount (and cost) of virgin material used in manufacturing the supply line 410. Although the first and second layers 460, 462 may be coextruded to form the supply line 410, in another approach, the layers 460, 462 are separately formed and the second layer 462 may be adhered to the first layer 460. In another approach, the first and second layers 460, 462 may be coextruded about the entire circumference of the supply line 410 as shown in FIG. 34. In yet another approach, the second layer 462 may be a round spot 463 (or a spot having a different shape) disposed about each opening 416 rather than extending along the entire length of the supply line 410, as shown in FIG. 31.

Figure 37:
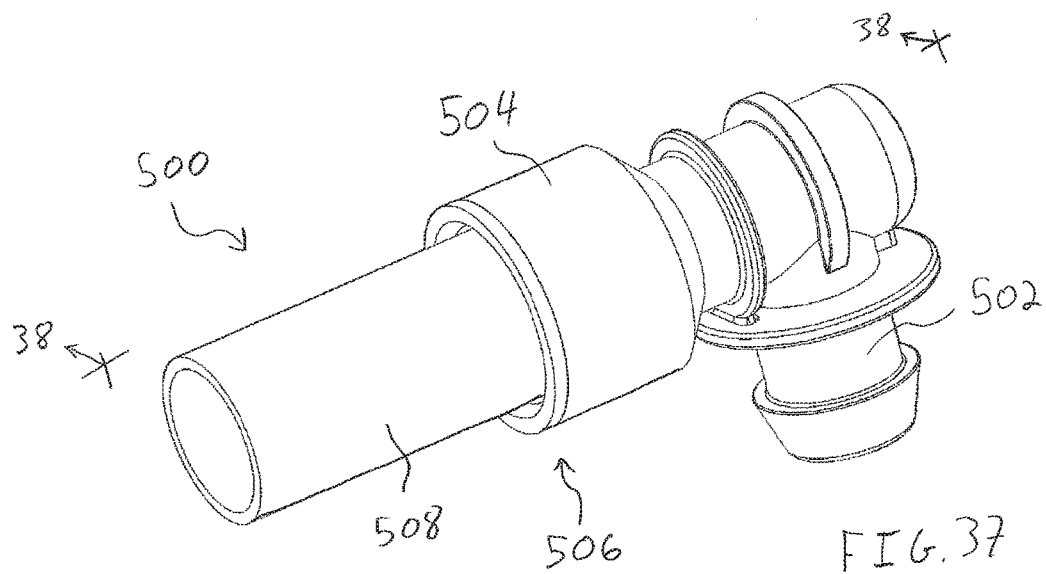
FIG. 37 is perspective view of another embodiment of a lateral connector.
Figure 38:
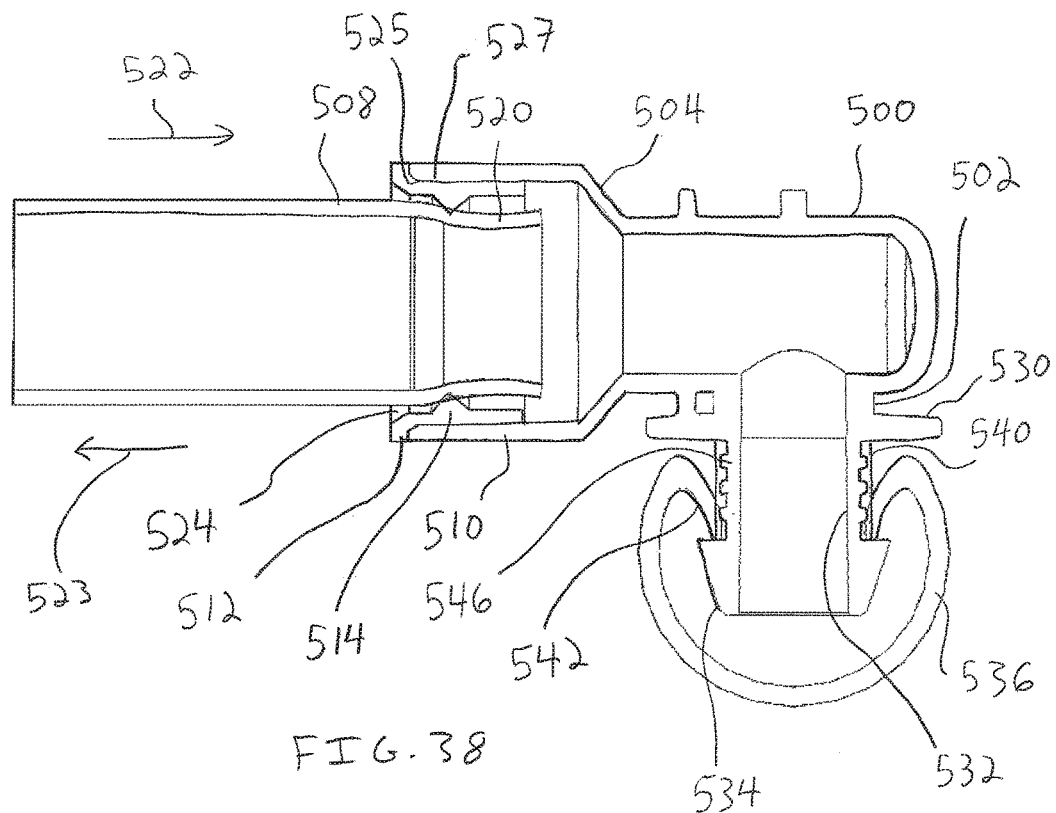
FIG. 38 is a cross-sectional view of the connector of FIG. 37 taken across line 38-38 in FIG. 37.
Figure 39:
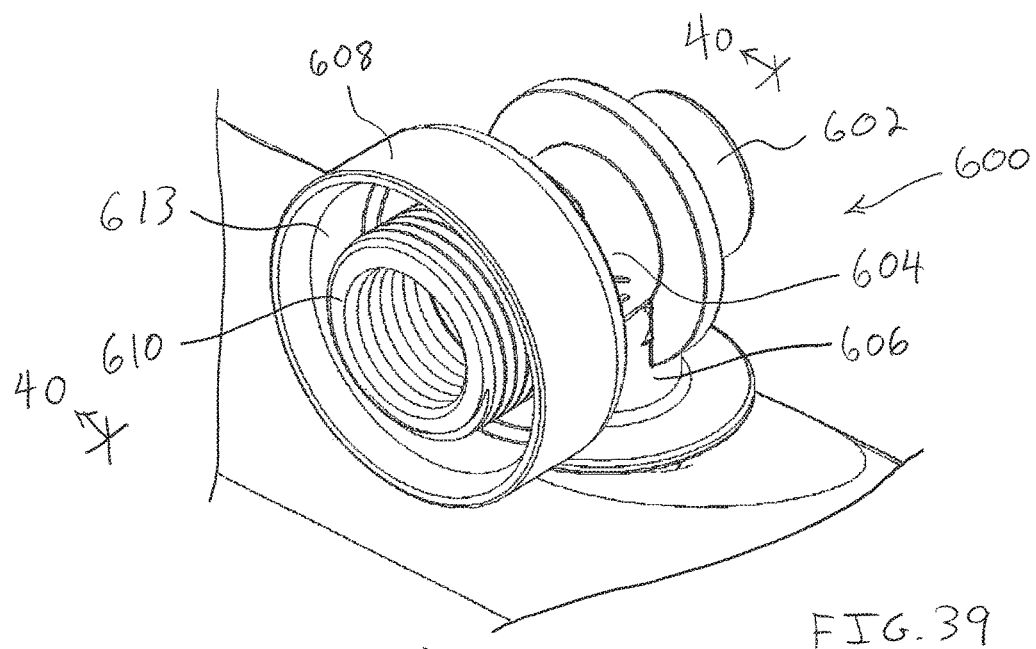
FIG. 39 is a perspective view of another embodiment of a lateral connector attached to a main supply line.
Figure 40:
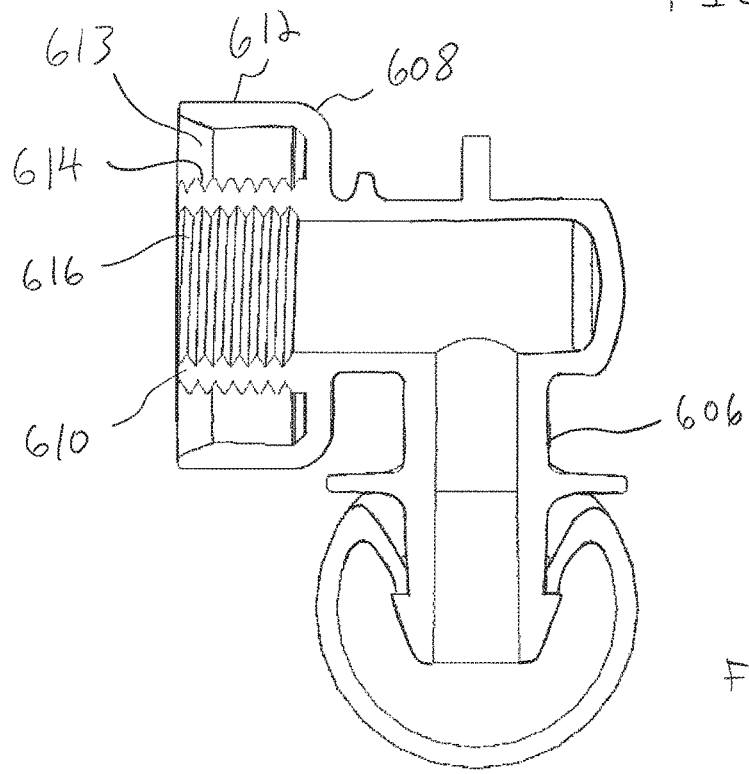
FIG. 40 is a cross-sectional view of the lateral connector and main supply line of FIG. 39 taken across line 40-40 in FIG. 39.

With reference to FIG. 37, another embodiment of a lateral connector 500 is shown. The lateral connector 500 includes an inlet segment 502 and a connecting segment 504 having a compression fit connection 506 with a dripline 508. With reference to FIG. 38, the compression fit connection 506 includes a socket 510 and a retention member 512 received in the socket 510. The retention member 512 has one or more teeth 514 configured to engage an end portion 520 of the dripline 508. The tooth 514 may be a single annular tooth extending about the circumference of the dripline 508 or multiple teeth spaced about the dripline 508. To connect the dripline 508 to the lateral connector 500, the dripline end portion 520 may be advanced in direction 522 into an opening 524 of the retention member 512. The one or more teeth 514 will bite into the outer surface of the dripline 508 and restrict withdrawal of the dripline 508 from within the connecting segment socket 510.

In another approach, an installer may remove the retention member 512 from the socket 510 and advance the retention member 512 onto the dripline end portion 520 in direction 523 (see FIG. 38). With the retention member 512 engaged on the dripline end portion 520, the installer then advances the assembled retention member 512 and dripline end portion 520 in direction 522 into the socket 510. In one form, the retention member 512 has a split ring configuration and the retention member 512 and socket 510 have mating cam surfaces 525, 527 which cause ends of the split ring retention member 512 to shift toward each other and compress the retention member 512 about the dripline end portion 520 as the assembled retention member 512 and dripline end portion 520 are advanced in direction 522 into the socket 510.

With reference to FIG. 38, the inlet segment 502 of the connector 500 includes a stop collar 530, a tubular wall 532, and a barb 534 operable to engage a supply line 536 consistent with the approaches discussed above. However, the connector 500 includes an intermediate component, such as an insert 540, for engaging and sealing against a sidewall 542 of the supply line 536. The insert 540 may provide an improved seal between the connector 500 and the supply line 536 in some applications because the insert 540 may be formed from a different material than the body 502 of the connector 500. For example, the insert 540 may be formed from an elastomeric material, such as silicone rubber or ethylene propylene diene monomer (EPDM), whereas the connector body 502 is formed from a rigid material, such as acetal or nylon. The rigid material of the connector body 502 thereby provides the desired strength for the connector 500, while the softer insert 540 seals with the supply line sidewall 542. The insert 540 may be molded onto the tubular wall 532 or, in another approach, may be a sleeve fit onto the tubular wall 532 after molding of the connector 500. In one approach, the tubular wall 532 has outer ribs 546 that restrict movement of the insert 540 along the tubular wall 532.

With reference to FIGS. 39-42, a lateral connector 600 is shown that provides a threaded, easy-to-install connection between a dripline 622 and the connector 600. The connector 600 has a body 602 with a connecting segment 604 and an inlet segment 606. The connecting segment 604 has a protector, such as a cup 608, disposed about a nipple 610 having outer threads 614 and inner threads 616. The cup 608 includes an outer wall 612 which is spaced from the nipple 610 and defines an annular recess 613 about the nipple 610. The nipple 610 is configured to be connected to the dripline 622 (see FIG. 41) and the recess 613 provides clearance for connecting the dripline 622 to the nipple 610 as will be discussed in greater detail below. Further, the cup 608 protects the nipple 610 during transport and installation of the connector 600.

Figure 41:
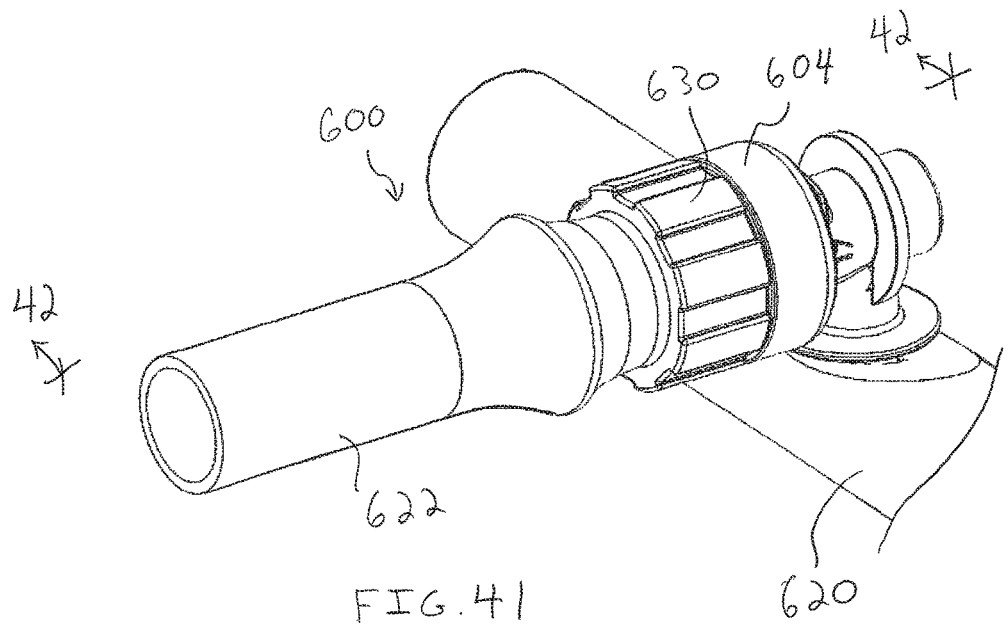
FIG. 41 is a perspective view of the lateral connector of FIG. 39 showing the lateral connector attaching the main supply line to a dripline.
Figure 42:
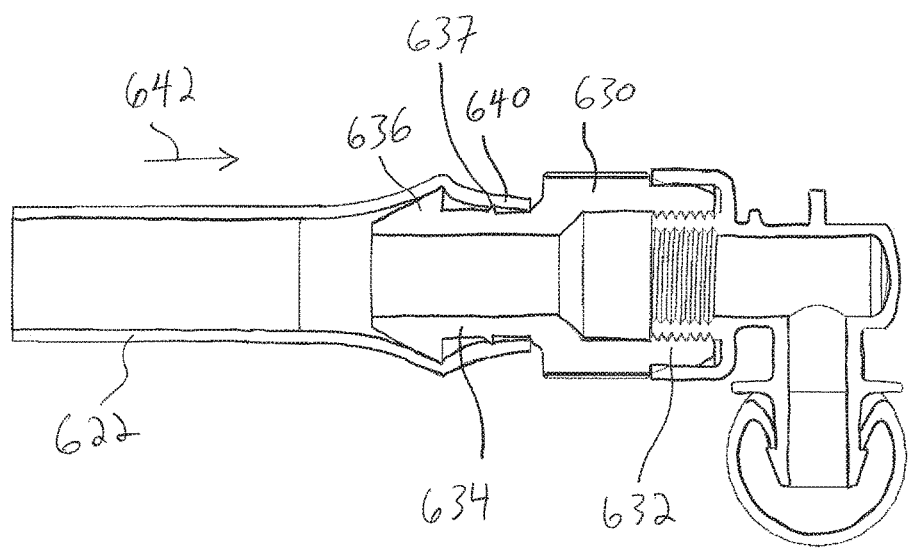
FIG. 42 is a cross-sectional view of the lateral connector of FIG. 41 taken across the line 42-42 in FIG. 41.

With reference to FIGS. 41 and 42, the connector 600 is shown mounted on a supply line 620 and connecting the supply line 620 to the dripline 622. The connecting segment 604 includes a fitting 630 having fitting threads 632 (see FIG. 42) that are threaded onto the outer threads 614 of the nipple 610 (see FIG. 40). In another form, the fitting 630 can be configured to engage the inner threads 616. The fitting 630 has a tubular wall 634 with an outer barb 636 and an inner barb 637 for engaging the dripline 622 and restricting removal of the dripline 622 from the fitting 630. In one approach, the fitting 630 is preassembled onto the dripline 622 and packaged separately from the supply line 620. Once the supply line 620 has been positioned in a desired location, an installer grasps the preassembled fitting 630 and dripline 622 and threads the fitting 630 onto the nipple 610. In this manner, the dripline 622 may be connected to the connector body 602 without having to walk the dripline 622 over the barbs 636, 637 at the installation site, which decreases the time it takes to install the supply line 620 and dripline 622. In another approach, the fitting 630 may be preassembled on the connector body 602 and packaged separately from the dripline 622. To connect the dripline 622 to the main supply line 620, an installer unthreads the fitting 630 from the nipple 610, advances an end portion 640 of the dripline 622 in direction 642 over the fitting barbs 636, 637, and then threads the fitting 630 back onto the nipple 610. This approach may also decrease installation times, since the fitting 630 is disconnected from the connector body 602 while the installer advances the dripline end portion 640 over the barbs 636, 637, which provides greater freedom to operate than if the fitting 630 was engaged with the nipple 610 during the process.

Figure 43:
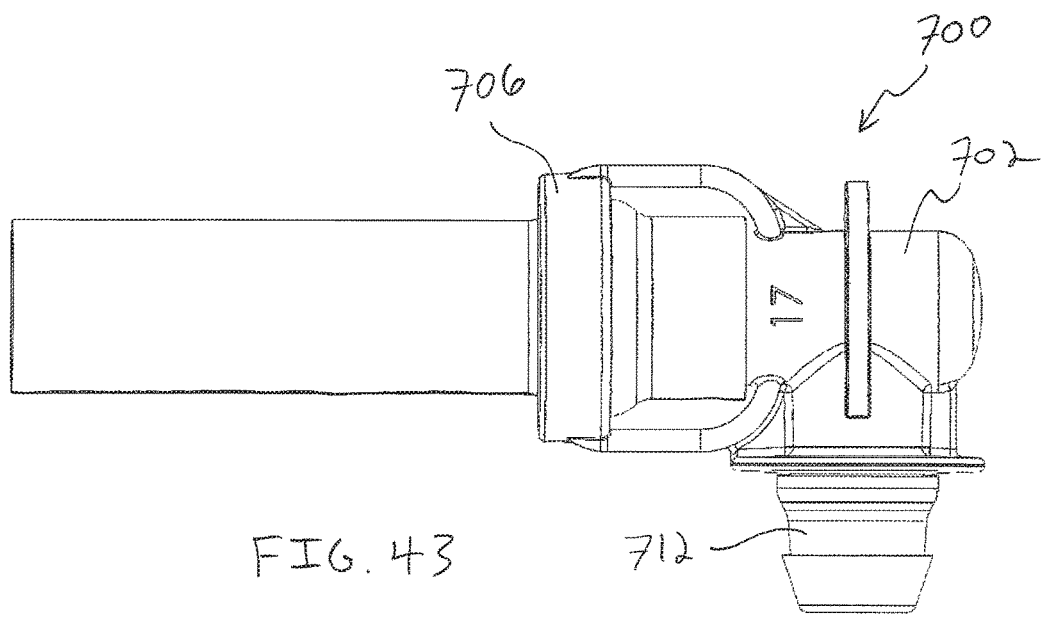
FIG. 43 is a side elevational view of another embodiment of a lateral connector.
Figure 44:
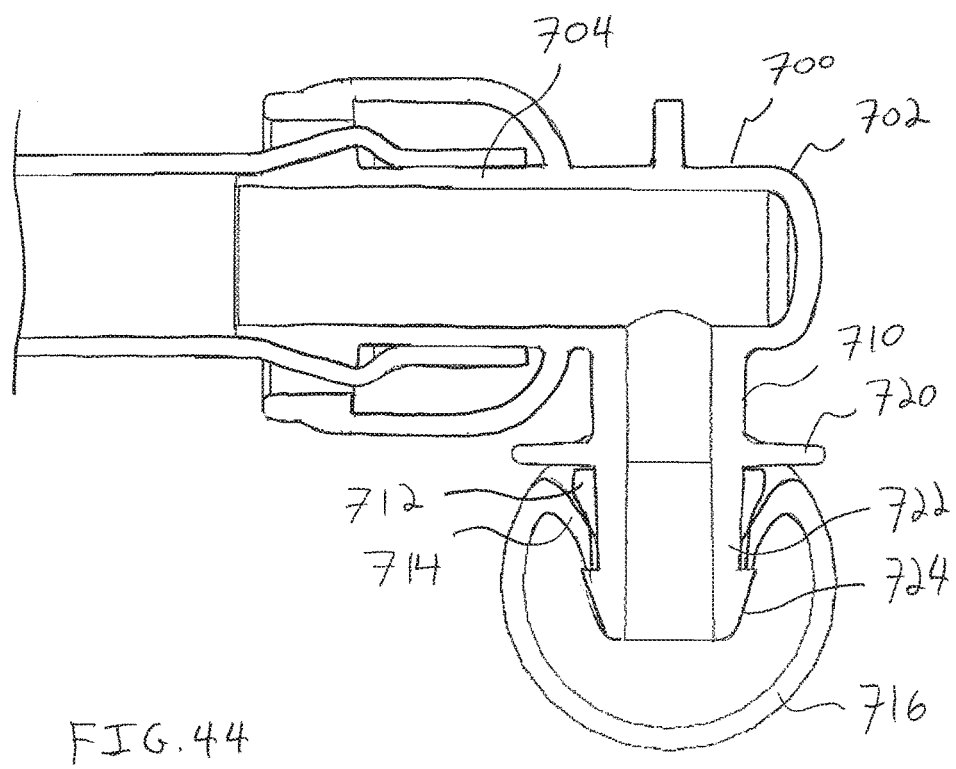
FIG. 44 is a cross-sectional view of the lateral connector of FIG. 43.

With reference to FIGS. 43 and 44, a lateral connector 700 is shown. The lateral connector 700 includes a body 702 having a connecting segment 704 and a protector 706. One difference between the connector 700 and the connector 200 is that the connector 700 includes an inlet segment 710 having an intermediate component, such as a gasket 712, for engaging and sealing against a sidewall 714 of a supply line 716. Like the insert 540 discussed above, the gasket 712 may be formed from a different material than the connector body 702 with the material of the gasket 712 being selected to provide sealing with the supply line sidewall 714 that is greater than could be achieved with only engagement between the materials of the connector body 602 and the supply line sidewall 714. The gasket 712 may include one or more elastomeric materials, such as silicone rubber or EPDM. The inlet segment 710 further includes a stop collar 720, a tubular wall 722 and a barb 724. The gasket 712 may be co-molded with a tubular wall 722 of the inlet segment 710 during manufacture of the connector 700. In another approach, the gasket 712 is fit over the barb 722 after molding of the connector body 702. The stop collar 720 and barb 724 are arranged and configured to restrict movement of the gasket 712 along the tubular wall 722.

Figure 45:
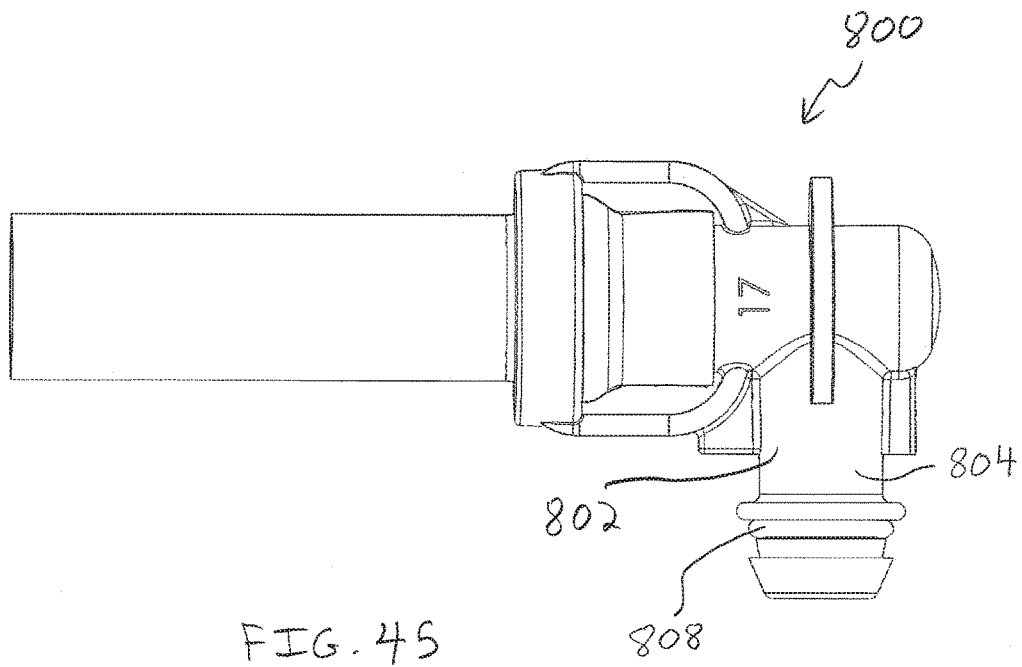
FIG. 45 is a side elevational view of another embodiment of a lateral connector.
Figure 46:
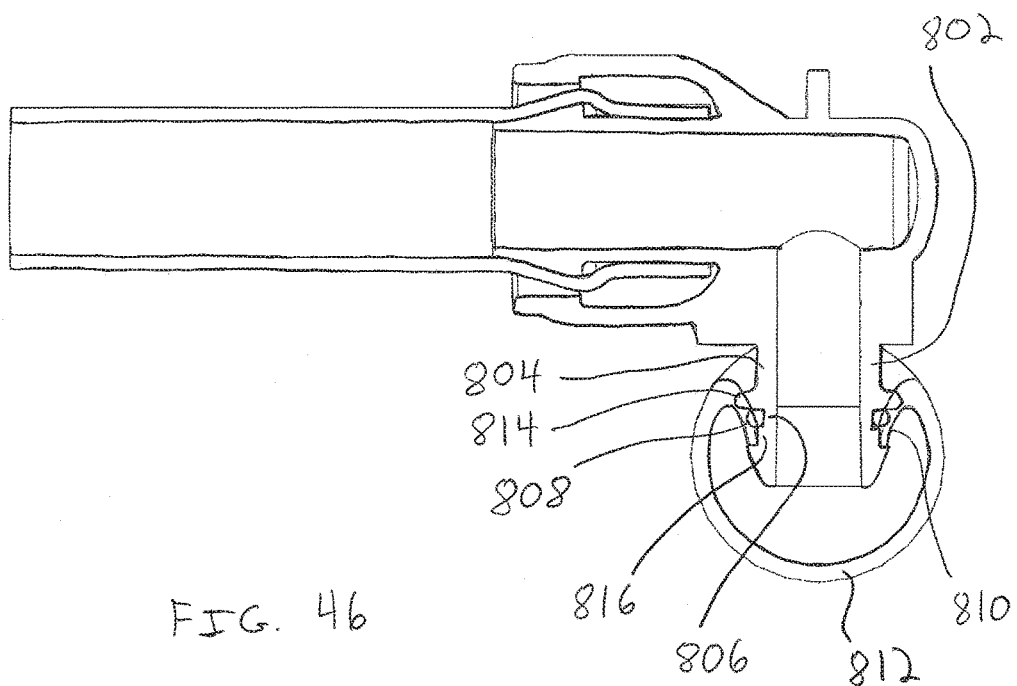
FIG. 46 is a cross-sectional view of the lateral connector of FIG. 45.

With reference to FIGS. 45 and 46, a lateral connector 800 is shown. The connector 800 has an inlet segment 802 with a tubular wall 804 and a channel 806 therein that receives an o-ring 808. The o-ring 808 engages and seals against a sidewall 810 of a supply line 812. The inlet segment 802 further includes a stop collar 814 and a step 816 which define the channel 806 and restrict movement of the o-ring 808. The o-ring 808 may be made from, for example, silicone rubber or EPDM.

Figure 47:
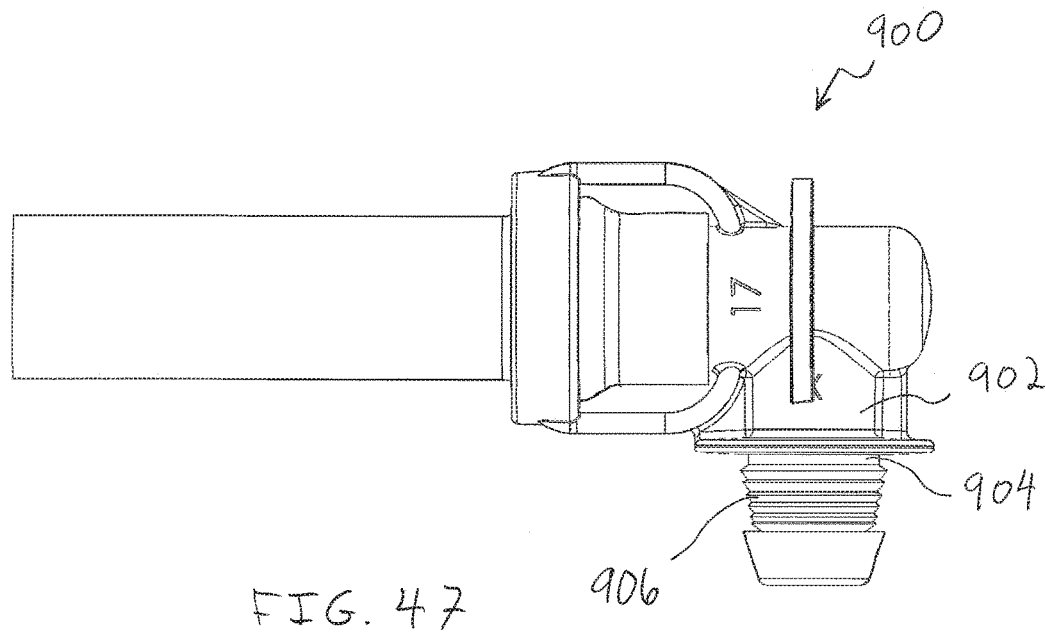
FIG. 47 is a side elevational view of another embodiment of a lateral connector.
Figure 48:
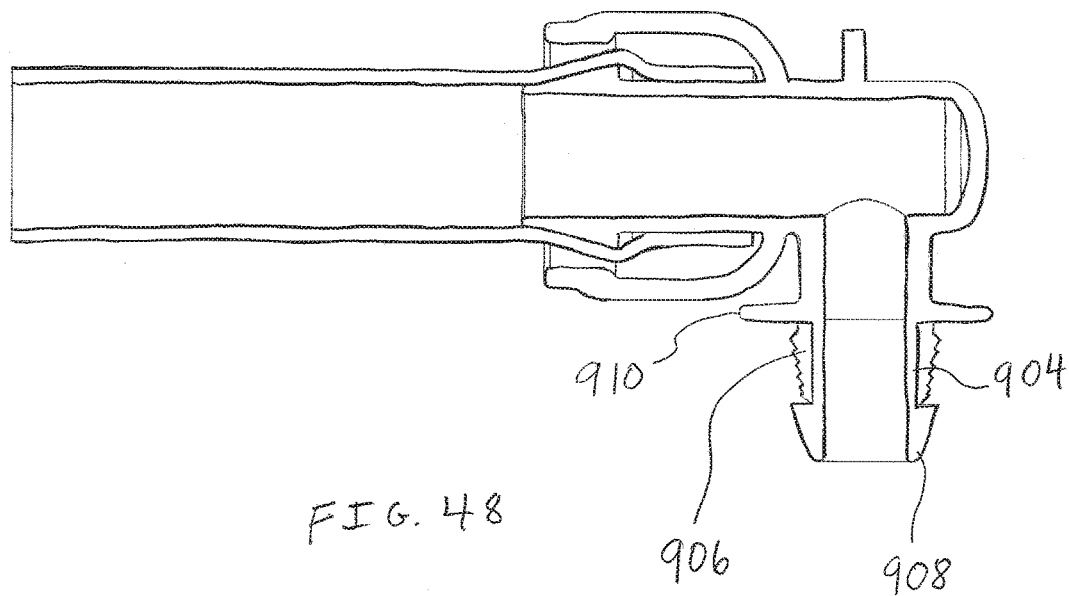
FIG. 48 is a cross-sectional view of the lateral connector of FIG. 47.

With reference to FIGS. 47 and 48, a connector 900 is shown that is substantially similar to the connectors 700 and 800 discussed above. One difference between the connector 900 and the connectors 700, 800 is that the connector 900 has an inlet segment 902 with a tubular wall 904 and one or more over-molded barbs 906. The barbs 906 include one or more annular barbs extending about the tubular wall 904 disposed along the length of the tubular wall 904. The barbs 906 may be co-molded with the tubular wall 904 and may be compressive. In another approach, the overmolded barbs 906 may be formed on a sleeve that is passed over a barb 908 of the inlet segment 902. The barb 908 and a stop collar 910 of the inlet segment 902 are arranged and configured to restrict movement of the barbs 906 along the tubular wall 904.

Figure 49:
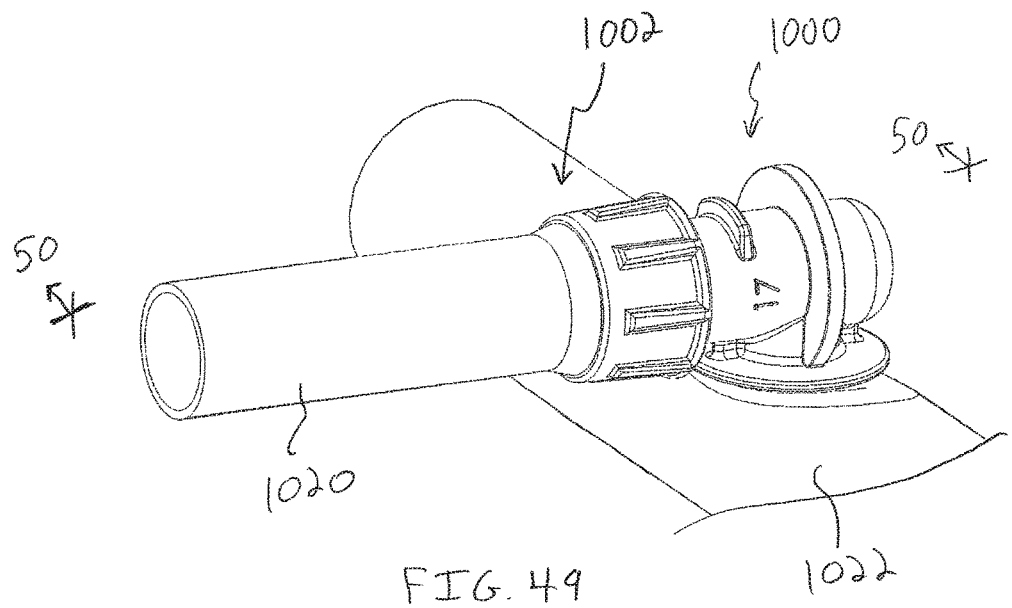
FIG. 49 is a perspective view of another embodiment of a lateral connector connecting a main supply line to a drip line.
Figure 50:
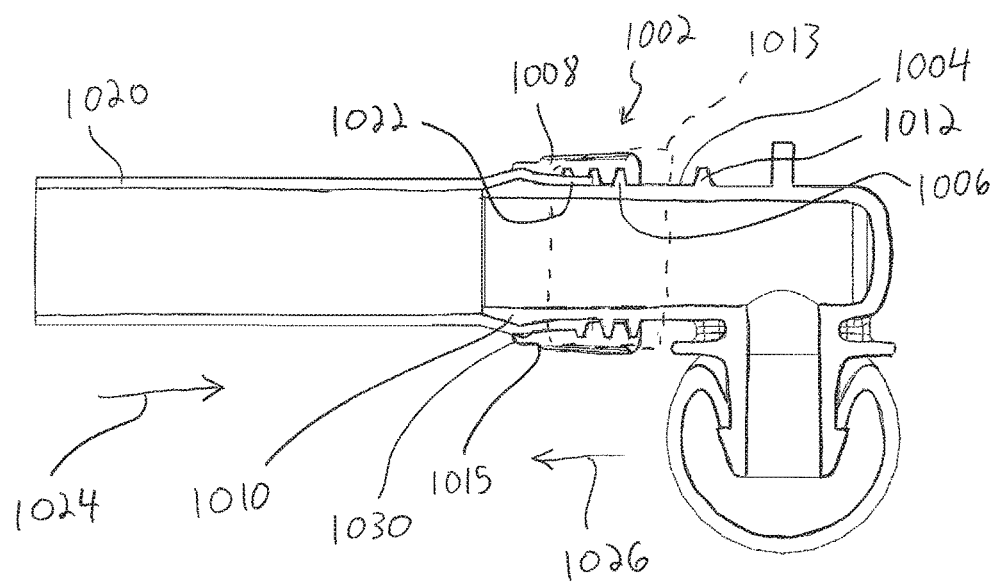
FIG. 50 is a cross-sectional view of the lateral connector of FIG. 49 taken across the line 50-50 in FIG. 49.

With reference to FIGS. 49 and 50, a lateral connector 1000 is shown that is similar in many respects to the lateral connectors discussed above. One difference between the connector 1000 and the connectors discussed above is that the connector 1000 includes a connecting segment 1002 with a tubular wall 1004 having outer threads 1006. The connecting segment 1002 further includes a nut 1008 captured on the tubular wall 1004 between an outer barb 1010 and a retention collar 1012 of the connecting segment 1002. The nut 1008 may be threaded in direction 1026 onto the threads 1006 from an unlocked position 1013 near the collar 1012 (see dashed lines in FIG. 50) to a locking position 1015 near the outer barb 1010.

To connect a dripline 1020 to the connector 1000, an end portion 1022 of the dripline 1020 is advanced in direction 1024 over the outer barb 1010 and along the tubular wall 1004. Then, the nut 1008 is threaded onto the threads 1006 from the unlocked position toward the locking position in direction 1026. The nut 1008 has a leading end 1030 that clamps the dripline end portion 1022 against the barb 1010 as the nut 1008 is tightened onto the threads 1006 and advances in direction 1026. The connector 1000 thereby provides an easy-to-lock connection between the dripline 1020 and the supply line 1022.

Figure 51:
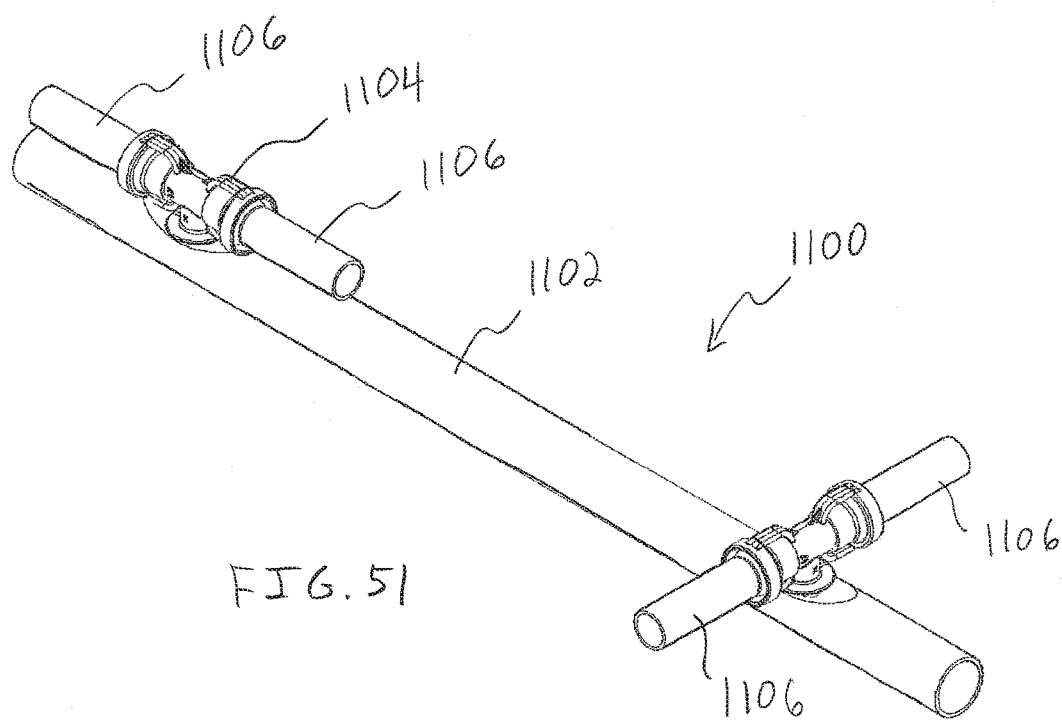
FIG. 51 is a perspective view of a main supply line having lateral connectors attached to lateral driplines.
Figure 52:
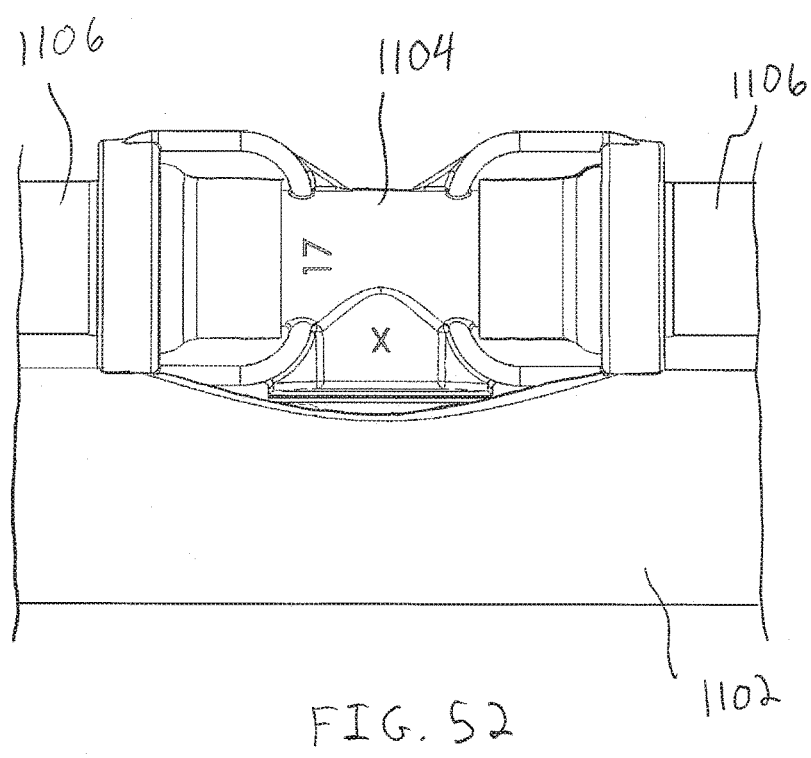
FIG. 52 is a front elevational view of one of the lateral connectors of the supply line of FIG. 51.
Figure 53:
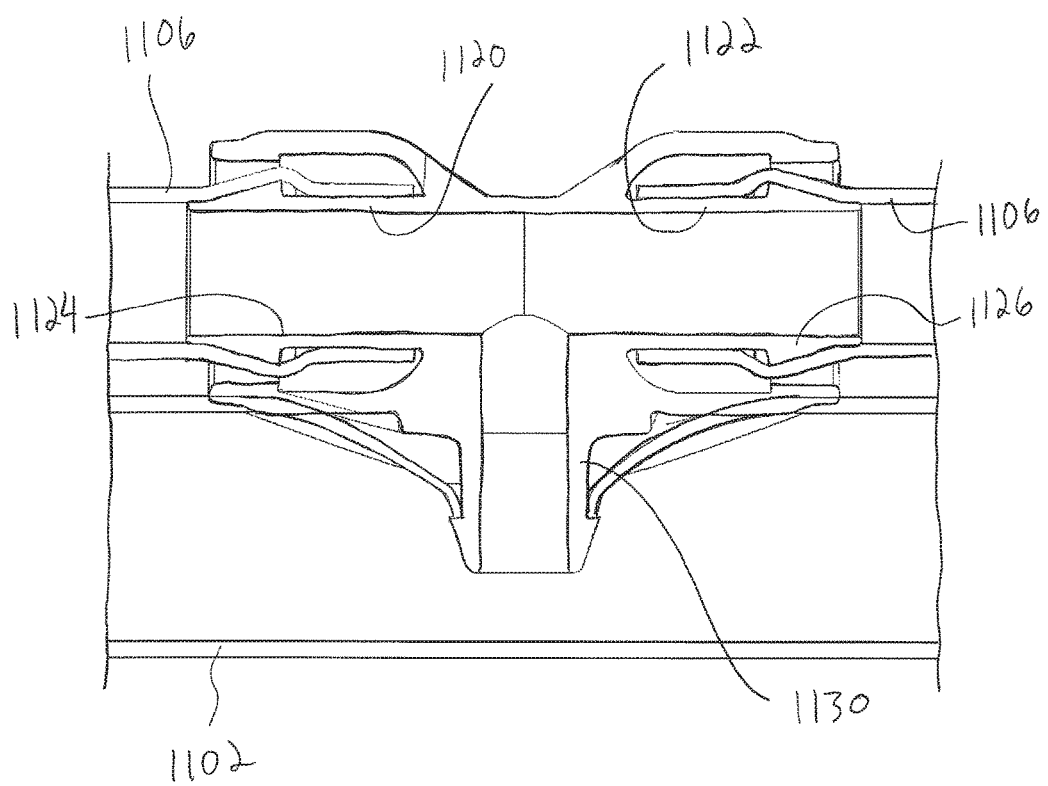
FIG. 53 is a cross-sectional view of the lateral connector of FIG. 52.

With reference to FIGS. 51-53, a preassembled main supply line 1100 is shown that includes a main supply line 1102 and lateral connectors 1104 for connecting the supply line 1102 to driplines 1106. The connectors 1104 are similar in many respects to the connector 200 discussed above. One difference between the connectors 1104 and the connector 200 is that each of the connectors 1104 has a pair of connecting segments 1120, 1122 configured to connect a pair of driplines 1106 to the supply line 1102, as shown in FIG. 53. The connecting segments 1120, 1122 include a pair of tubular members 1124, 1126 that tee apart from an inlet segment 1130 of the connector 1000 and direct fluid flow into the driplines 1106.

Figure 54:
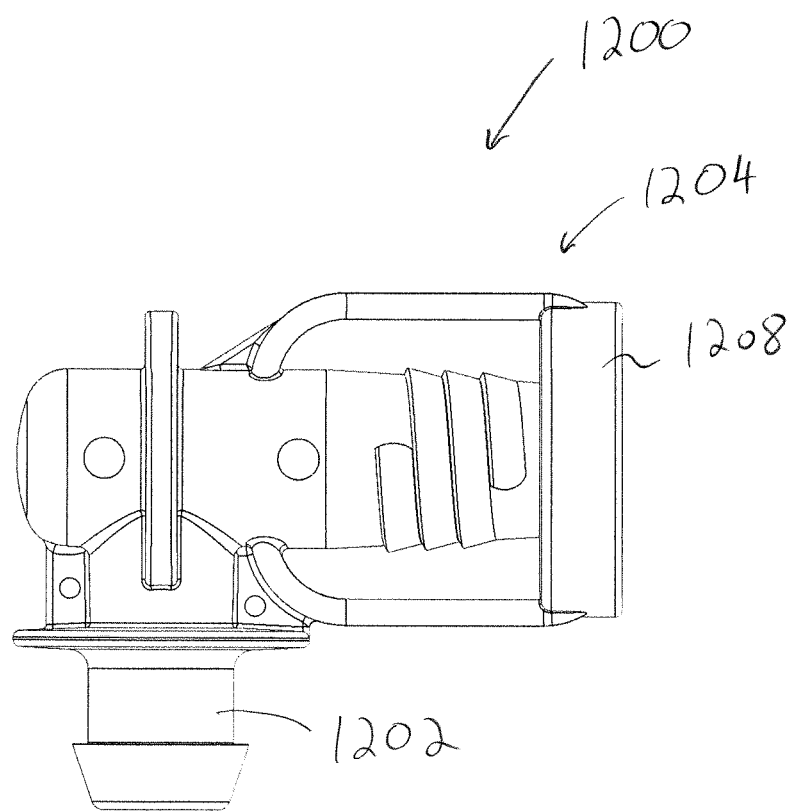
FIG. 54 is an elevational view of another embodiment of a lateral connector.
Figure 55:
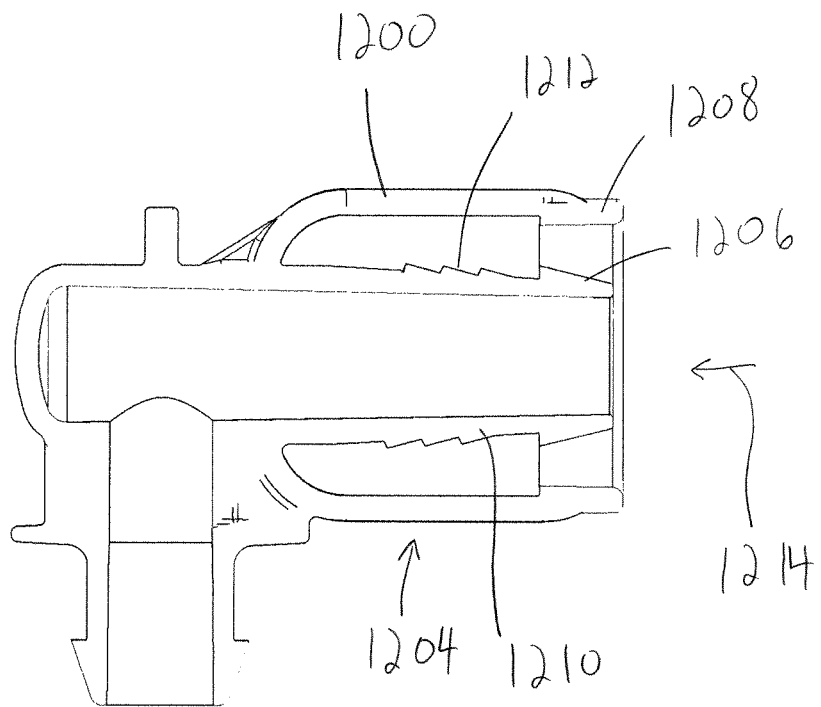
FIG. 55 is a cross-sectional view of the lateral connector of FIG. 54.

With reference to FIGS. 54 and 55, a connector 1200 is provided that is similar in many respects to the connectors discussed above. The connector 1200 includes an inlet segment 1202 for connecting to a supply line and a connecting segment 1204 for receiving a secondary line such as a dripline. The connecting segment 1204 includes a barb 1206, a protector 1208 extending about the barb 1206, and a tubular wall extending away from the barb 1206. The connecting segment 1204 includes a spiral barb 1212 for providing additional grip on a dripline. More specifically, a user may advance a dripline in direction 1214 to pass the dripline over the barb 1206 and onto the spiral barb 1212. A user may then turn the dripline to advance the dripline along the spiral barb 1212 and firmly engage the dripline with the spiral barb 1212.

Figure 56:
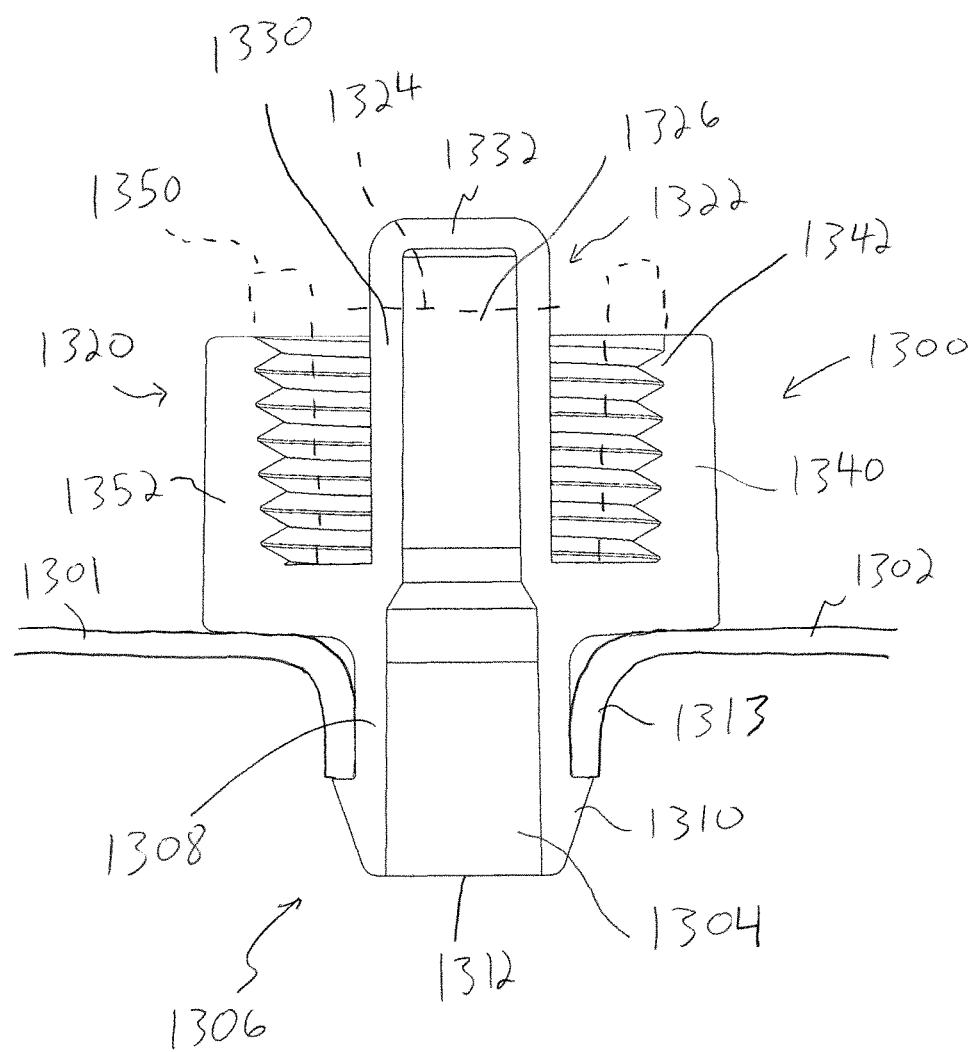
FIG. 56 is a cross-sectional view of another embodiment of a lateral connector engaged with a supply line.

With reference to FIG. 56, a connector 1300 is provided that is preassembled with a supply line 1301 in a manner similar to the connectors discussed above. The connector 1300 has an initial, closed configuration wherein a fluid passageway 1304 of the connector 1300 is closed. If a user wants to connect a lateral line to the connector 1300, the user reconfigures the connector 1300 to an open configuration whereby the fluid passageway 1304 is opened and fluid can flow from within the fluid supply line 1301, through the fluid passageway 1304, and into the dripline via the connector 1300.

More specifically, the connector 1300 includes an inlet segment 1306 having a tubular wall 1308 and an annular protrusion such as a barb 1310, and an inlet opening 1312. The supply line 1301 includes a sidewall 1302 extending inward into the supply line and a portion 1313 of the sidewall 1302 forms a seal with the inlet segment 1306. The connector 1300 includes a connecting segment 1320 adapted to receive a lateral line. The connecting segment 1320 includes a removable portion, such as a break-away member 1322, that may be cut along a line 1324 to form an opening 1326 through which water or other liquid may exit the connector 1300. The break-away member 1322 includes a tubular wall 1330 and a closed end 1332. The connector 1300 may have a unitary, one-piece construction and may be made of, for example, a plastic material. The material and thickness of the tubular wall 1330 are selected to permit the tubular wall 1300 to be cut along line 1322 using a readily available tool, such as scissors. The connecting segment 1320 includes a socket 1340 having a connecting protrusion, such as a thread 1342, surrounding at least a portion of the break-away member 1322. The dripline may include a fitting 1350 have a thread that engages the thread 1342 of the connector 1300. The fitting 1350 may be arranged so that a wall 1352 of the socket 1340 is concentric with both the fitting 1350 and the tubular wall 1330 of the break-away member 1322. In this manner, the coiled fluid supply line 1301 containing the supply line sidewall 1302 and the plurality of connectors 1300 may be laid out at an installation site and the break-away members 1322 cut at the connectors 1300 which an installer wants to use to connect driplines. Once the break-away members 1322 of each of the selected connector 1300 has been cut, the user may connect a dripline and fitting 1350 thereof to the socket 1340 to place the dripline in communication with the supply line 1301.

Figure 57:
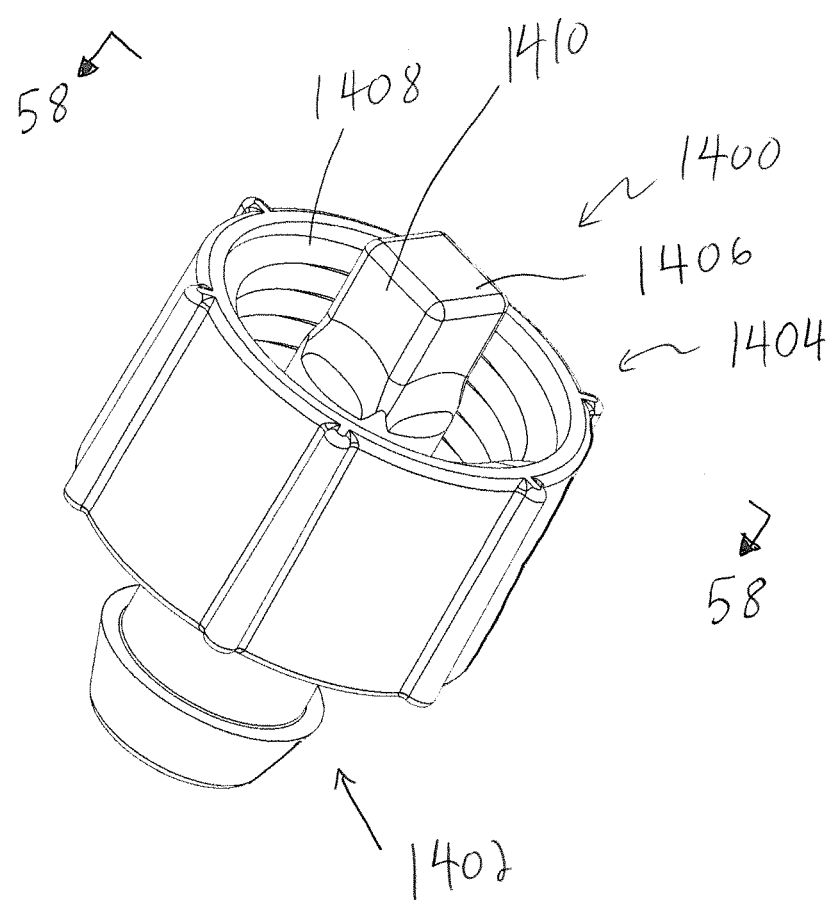
FIG. 57 is a perspective view of another embodiment of a lateral connector.
Figure 58:
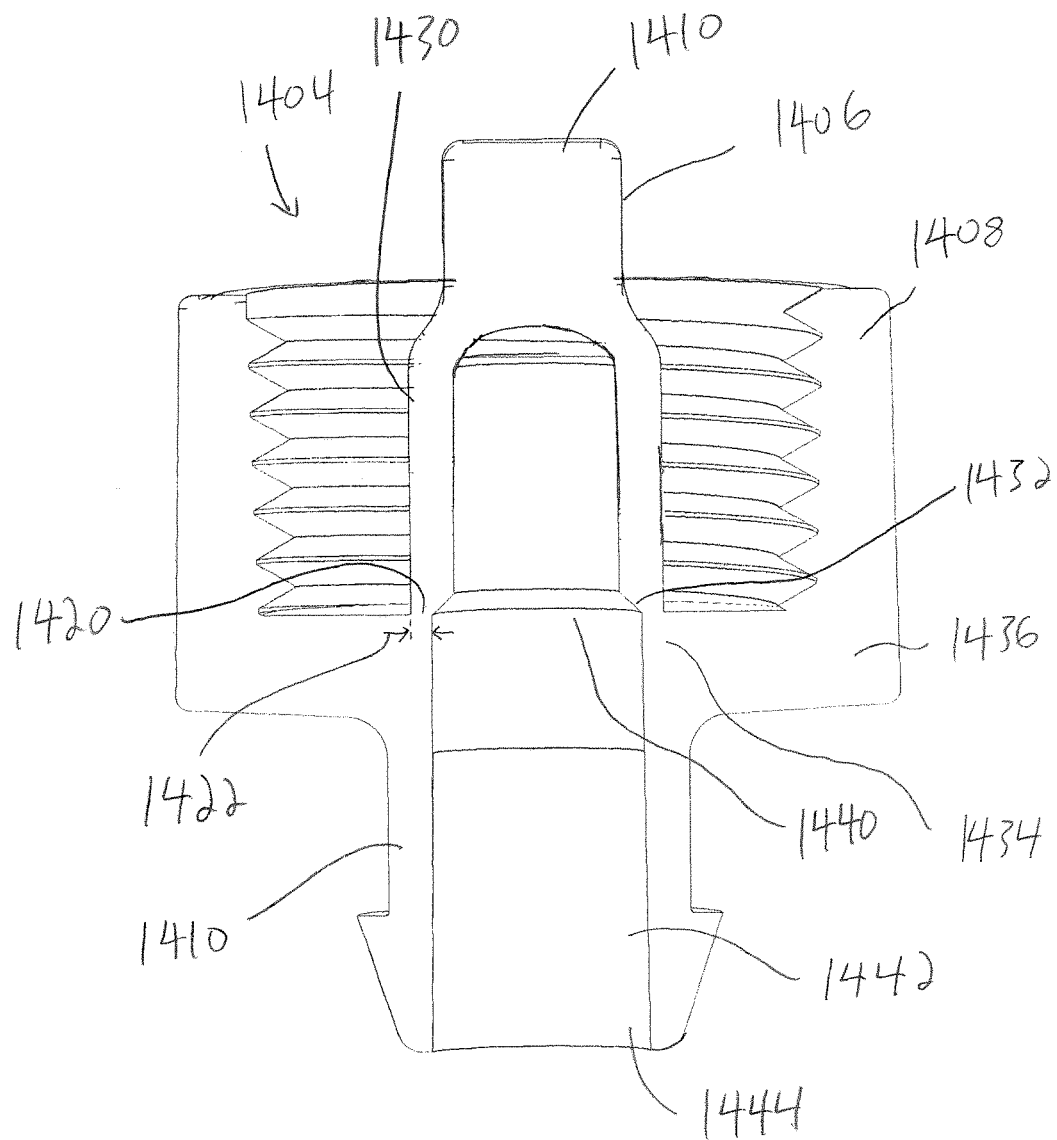
FIG. 58 is a cross-sectional view taken across line 58-58 in FIG. 57.

With reference to FIGS. 57 and 58, a connector 1400 is provided that is similar in many respects to the connector 1300 discussed above. The connector 1400 includes an inlet segment 1402 for connecting to a supply line and a connecting segment 1404 for being connected to a dripline. The connecting segment 1404 includes a removal portion, such as a break-away member 1406, and a socket 1408. The break-away member 1406 includes a rotary drive structure, such as a square end 1410. To reconfigure the connector 1400 from an initial, closed configuration to an open configuration, a user connects a wrench to the square end 1410 and applies a torque to the break-away member 1406. With reference to FIG. 58, the break-away member 1406 includes a frangible portion 1420 having a reduced thickness 1422. The material of the break-away member 1406 shears off at the frangible portion 1420 in response to the torque applied to the square end 1410. In one form, the break-away member includes a tubular wall 1430 having a tapered portion 1432 that tapers outwardly to meet a wall 1434 of a base 1436 of the connecting segment 1404. The tapered portion 1432 focuses the shearing forces at the frangible portion 1420 and operates to form a smooth break at the frangible portion 1420. Once the break-away member 1406 has been removed, the connector 1400 has an outlet opening 1440 in communication with a fluid flow path 1442 and an inlet opening 1444 of the inlet segment 1410.

While the foregoing description is with respect to specific embodiments, those skilled in the art will appreciate that there are numerous variations of the above that fall within the scope of the concepts described herein and the appended claims. For example, those skilled in the art will appreciate that the foregoing embodiments may be modified to include one or more features from different embodiments, or that one or more features of an embodiment may be replaced with one or more features of a different embodiment. As but one example in this regard, the overmolded barbs 906 of the connector 900 may be added to the connector 600.

What is claimed is:

1. An irrigation line comprising:
   a flexible conduit having a side wall with a plurality of openings;
   a plurality of connectors assembled with the conduit, each of the plurality of connectors having an inlet segment extending into one of the side wall openings and a connecting segment outside of the conduit;
   portions of the conduit extending into the conduit and forming non-threaded seals with the inlet segments of the plurality of connectors;
   each of the connecting segments having a connection protrusion outside of the conduit and adapted to receive a lateral line; and
   a plurality of protectors each extending about an associated one of the connection protrusions outside of the conduit.

2. The irrigation line of claim 1 wherein each of the protectors has a unitary, one-piece construction with the associated connection protrusion.

3. The irrigation line of claim 1 wherein each of protectors is separated from the associated connection protrusion by gap spacing.

4. The irrigation line of claim 3 wherein the gap spacings are sized to permit end portions of lateral lines to be advanced between the protectors and the connecting segments.

5. The irrigation line of claim 1 further comprising supports connecting the protectors to the connecting segments.

6. The irrigation line of claim 1 wherein the connecting segments are rotatable relative to the conduit.

7. The irrigation line of claim 1 wherein the inlet segments each include a barb and the connection protrusions each include a barb.

8. The irrigation line of claim 1 further comprising a plurality of flexible lateral lines for being connected to the connecting segments of the connectors.

9. An irrigation line comprising:
   a coiled conduit having a side wall with a plurality of openings;
   a plurality of connectors being assembled with the coiled conduit, the connectors each having an inlet segment extending into the side wall of one of the plurality of openings and a connecting segment outside of the conduit;
   the inlet segments of the connectors each including a tube portion and an enlarged portion upstream of the tube portion; and
   portions of the conduit extending into the conduit and forming seals with the tube portions of the inlet segments of the connectors,
   wherein the enlarged portions are wider than the tube portions to permit the enlarged portions to contact the portions of the conduit extending into the conduit and inhibit removal of the connectors from the conduit.

10. The irrigation line of claim 9 wherein the connecting segments are rotatable relative to the conduit.

11. The irrigation line of claim 9 wherein the connectors each include a stop portion intermediate the inlet segment and the connecting segment, the stop portion being adapted to limit movement of the connector into the conduit.

12. The irrigation line of claim 9 wherein each connector includes a flange portion spaced from the enlarged portion by the tube portion.

13. The irrigation line of claim 9 wherein the connecting segments each include threads.

14. An irritation line comprising
   a coiled conduit having a side wall with a plurality of openings;
   a plurality of connectors being assembled with the coiled conduit, the connectors each having an inlet segment extending into the side wall of one of the plurality of openings and a connecting segment outside of the conduit;
   portions of the conduit extending into the conduit and forming seals with the inlet segments of the connectors; and
   frangible members adapted to be removed to open outlet openings of the connecting segments of the connectors.

15. The irrigation line of claim 14 wherein the connecting segments are rotatable relative to the conduit.

16. The irrigation line of claim 14 wherein the inlet segments each include a barb and a tubular wall downstream of the barb, each of the portions of the conduit forming a seal with one of the inlet segments at the tubular wall thereof.

17. The irrigation line of claim 14 wherein the connectors each include a stop portion intermediate the inlet segment and the connecting segment, the stop portion being adapted to limit movement of the connector into the conduit.

18. The irrigation line of claim 14 wherein the inlet segment of each connector includes a barb and a tube extending downstream of the barb;
   each connector includes a flange portion spaced from the barb by the tube; and
   each portion of the conduit forms the seal with one of the connectors at the tube thereof.

19. The irrigation line of claim 14 wherein connecting segments each include threads.

20. An irrigation line comprising:
   a coiled conduit having a side wall with a plurality of openings;
   a plurality of connectors being assembled with the coiled conduit, the connectors each having an inlet segment extending into the side wall of one of the plurality of openings and a connecting segment outside of the conduit adapted to receive a secondary line;
   portions of the conduit extending into the conduit and forming seals with the inlet segments of the connectors;
   each inlet segment including an annular protrusion inside of the conduit; and
   each connecting segment including a removable portion configured to be removed to form an outlet opening of the connecting segment.

21. The irrigation line of claim 20 wherein each of the connectors has a unitary, one-piece construction.

22. The irrigation line of claim 20 wherein the removable portion of each of the connectors includes a break-away member.

23. The irrigation line of claim 22 wherein the break-away member is configured to be cut.

24. The irrigation line of claim 22 wherein the break-away member includes a frangible portion.

25. The irrigation line of claim 20 wherein the removable portion of each of the connectors includes a tubular wall.

26. The irrigation line of claim 20 wherein the connecting segment of each of the connectors includes a connection protrusion surrounding at least a portion of the removable portion.

27. The irrigation line of claim 20 wherein the removable portion includes a rotary drive structure.

28. The irrigation line of claim 20 wherein each connecting segment includes a threaded socket.

29. The irrigation line of claim 20 wherein each connecting segment includes a base and the removable portion of the connecting segment is upstanding from the base.

* * * * *